United States Patent
Song

(10) Patent No.: US 12,505,012 B2
(45) Date of Patent: Dec. 23, 2025

(54) SEMICONDUCTOR SYSTEM PERFORMING ERROR CHECK SCRUB OPERATION

(71) Applicant: SK hynix Inc., Icheon-si (KR)

(72) Inventor: Choung Ki Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 64 days.

(21) Appl. No.: 18/430,871

(22) Filed: Feb. 2, 2024

(65) Prior Publication Data

US 2025/0117288 A1    Apr. 10, 2025

(30) Foreign Application Priority Data

Oct. 5, 2023  (KR) .................. 10-2023-0132921

(51) Int. Cl.
*G06F 11/10*    (2006.01)

(52) U.S. Cl.
CPC .................. *G06F 11/106* (2013.01)

(58) Field of Classification Search
None
See application file for complete search history.

(56) References Cited

U.S. PATENT DOCUMENTS

2020/0004624 A1*  1/2020  Li .................. H03M 13/152
2021/0141691 A1*  5/2021  Song .................. G06F 11/1068

FOREIGN PATENT DOCUMENTS

| KR | 100415136 B1 | 4/2004 | |
| KR | 1020220085750 A | 12/2022 | |
| WO | WO-2017065802 A1 * | 4/2017 | ............ G06F 11/106 |

* cited by examiner

*Primary Examiner* — Guerrier Merant
(74) *Attorney, Agent, or Firm* — WILLIAM PARK AND ASSOCIATES LTD.

(57) ABSTRACT

A semiconductor system includes a controller configured to output a command and address for performing an ECS operation after the start of entry into a power-down operation, receive data and output the data in response to correcting one or more errors occurring in the data, and output a command for performing a self-refresh operation when the ECS operation is terminated, and a semiconductor device configured to output, as the data, internal data stored in multiple memory cells after the start of a read operation of the ECS operation in response to receiving the command and address, receive the data having the one or more errors corrected after the start of a write operation of the ECS operation, store the data having the one or more errors corrected, and perform a self-refresh operation on the multiple memory cells after receiving the command when the ECS operation is terminated.

37 Claims, 20 Drawing Sheets

SEMICONDUCTOR SYSTEM PERFORMING ERROR CHECK SCRUB OPERATION

CROSS-REFERENCE TO RELATED APPLICATION

The present application claims priority under 35 U.S.C. § 119 (a) to Korean Patent Application No. 10-2023-0132921, filed in the Korean Intellectual Property Office on Oct. 5, 2023, the entire disclosure of which is incorporated herein by reference.

BACKGROUND

The present disclosure relates to a semiconductor system that performs a self-refresh operation after performing an error check scrub operation on all the memory cells of multiple bank groups after the start of entry into a power-down operation.

Recently, in order to increase the operating speed of a semiconductor device, Double Data Rate 2 (DDR2), DDR3, DDR4, and DDR5 methods of inputting and outputting data are used to process multiple bits every clock cycle. When the input/output speed of data increases, a separate device and method for guaranteeing the reliability of data transmission are needed because the probability that an error occurs in the data transfer process is also increased.

A method of guaranteeing the reliability of data transmission includes generating an error check code (ECC) capable of checking or verifying whether an error occurs whenever data are transmitted and transmitting the ECC along with the data. The ECC includes an error detection code (EDC) capable of detecting an error and an error correction code (ECC) capable of autonomously correcting an error when the error occurs.

The possibility that a failure may occur is increased in a semiconductor device when internal data that have been stored in adjacent memory cells are lost after the start of a write operation and a read operation that are repeatedly performed. In order to prevent or reduce the possibility of an error in the internal data, the semiconductor device performs an error check scrub (ECS) operation that corrects errors in the stored internal data and stores the internal data again using an ECC. The ECS operation corrects errors in internal data stored in all memory cells included in a semiconductor device by sequentially activating all the memory cells and storing the internal data again. The ECS operation is performed periodically in time in order to prevent a failure of internal data.

SUMMARY

In an embodiment, a semiconductor system may include a controller configured to output a command and an address for performing an error check scrub (ECS) operation after the start of entry into a power-down operation, configured to receive data and output the data in response to correcting one or more errors occurring in the data, and configured to output a command for performing a self-refresh operation when the ECS operation is terminated, and a semiconductor device configured to output, as the data, internal data stored in multiple memory cells after the start of a read operation of the ECS operation in response to receiving the command and the address, configured to receive the data having one or more errors corrected after the start of a write operation of the ECS operation, configured to store the data having the error corrected among the multiple memory cells, and configured to perform a self-refresh operation on the multiple memory cells after receiving the command when the ECS operation is terminated.

In an embodiment, a semiconductor system may include a controller configured to output a command and an address for performing an error check scrub (ECS) operation after the start of entry into a power-down operation, configured to receive data and output the data in response to correcting one or more errors occurring in the data, configured to generate a flag signal that is generated for a set period after the start of the entry into the power-down operation, and configured to block the output of the command and the address for the ECS operation while the flag signal is generated when the power-down operation is entered after the ECS operation is completed, and a semiconductor device configured to output, as the data, internal data stored in multiple memory cells after the start of a read operation of the ECS operation in response to receiving the command and the address, configured to receive the data having the one or more errors corrected after the start of a write operation of the ECS operation, configured to store the data having the one or more errors corrected among the multiple memory cells.

In an embodiment, an error check scrub method may include an error check scrub (ECS) operation comprising sequentially performing a read operation and a write operation on multiple memory cells after the start of a power-down operation, a precharge operation comprising applying a precharge signal to the multiple memory cells when ECS operations for the multiple memory cells are terminated, and a self-refresh operation comprising sequentially activating multiple word lines that are connected to the multiple memory cells after the precharge operation is performed.

In an embodiment, an error check scrub method may include an error check scrub (ECS) operation comprising alternately performing a read operation and a write operation on first bank group and a second bank group after the start of a power-down operation, a precharge operation comprising applying a precharge signal to the first bank group and the second bank group when ECS operations for the first bank group and the second bank group are terminated, and a self-refresh operation comprising sequentially activating multiple word lines that are connected to multiple memory cells after the precharge operation is performed.

In an embodiment, an error check scrub method may include an error check scrub (ECS) operation comprising sequentially performing a read operation and a write operation on multiple memory cells by detecting a logic level of a flag signal after the start of a power-down operation, generating the flag signal that for a set period when all ECS operations are performed on the multiple memory cells and the power-down operation is entered, a precharge operation comprising applying a precharge signal to the multiple memory cells when ECS operations are terminated on the multiple memory cells, and a self-refresh operation comprising sequentially activating multiple word lines that are connected to the multiple memory cells after the flag signal is enabled or the precharge operation is performed.

In an embodiment, a semiconductor system may include a controller configured to perform an error check scrub (ECS) operation after entering a power-down operation, configured to correct one or more errors occurring in received data yielding corrected data and output the corrected data, and configured to output a command for performing a self-refresh operation when the ECS operation is terminated; and a semiconductor device configured to output data stored in multiple memory cells, configured to receive and store the corrected data in a plurality of the multiple memory cells, and configured to perform a self-refresh operation on the multiple memory cells in response to receiving the command when the ECS operation is terminated.

In an embodiment, a semiconductor system may include a controller configured to perform an error check scrub (ECS) operation after entering a power-down operation, configured to correct one or more errors occurring in received data yielding corrected data and output the corrected data, configured to generate a flag signal for a set period after the entering the power-down operation, and configured to block the ECS operation while the flag signal is generated when the power-down operation is entered after the ECS operation is completed; and a semiconductor device configured to output data stored in multiple memory cells, and configured to receive and store the corrected data in a plurality of the multiple memory cells.

DETAILED DESCRIPTION

Figure 1:
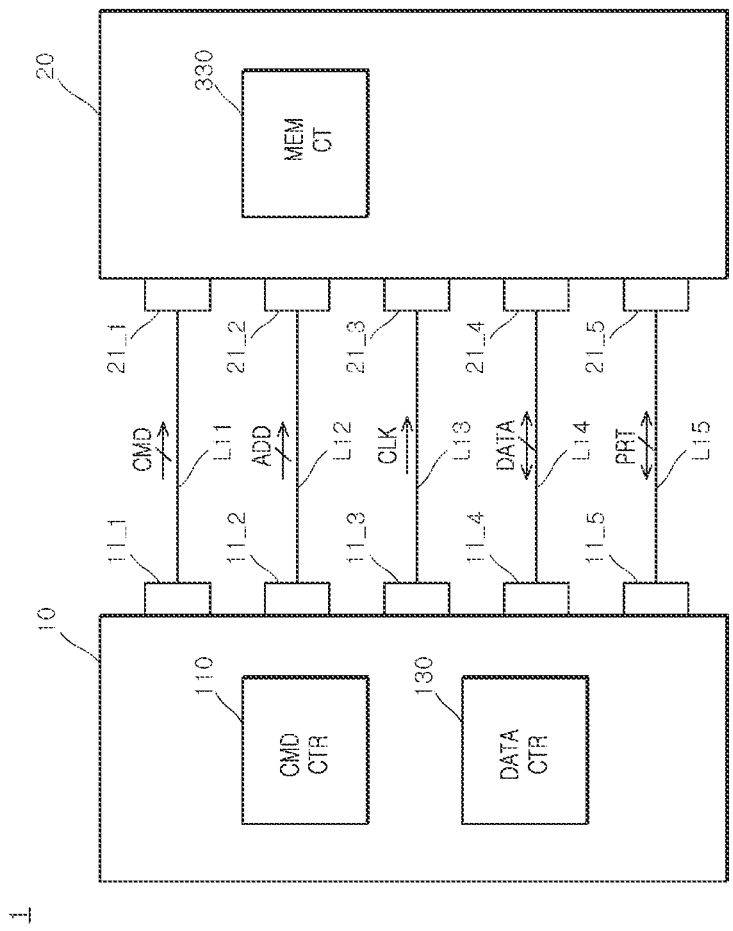
FIG. 1 is a block diagram illustrating a semiconductor system according to an embodiment of the present disclosure.

In the descriptions of the following embodiments, the term "preset" indicates that the numerical value of a parameter is previously determined when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa. The terms "first" and "second" do not necessary denote order, for example, the first process need not occur before the second process.

When one component is referred to as "coupled" or "connected" to another component, the components may be directly coupled or connected to each other or coupled or connected to each other through another component or components interposed therebetween. In contrast, when one component is referred to as being "directly coupled" or "directly connected" to another component, the components are directly coupled or connected to each other without another component interposed therebetween.

A "logic high level" and a "logic low level" are used to describe the logic levels of signals. A signal at a "logic high level" is distinguished from a signal at a "logic low level." For example, when a signal at a first voltage corresponds to a signal at a "logic high level," a signal at a second voltage may correspond to a signal at a "logic low level." According to an embodiment, a "logic high level" may be set to a voltage greater in magnitude than a "logic low level." According to an embodiment, the logic levels of signals may be set to different logic levels or opposite logic levels. For example, a signal at a logic high level may be set at a logic low level in some embodiments, and a signal at a logic low level may be set at a logic high level in some embodiments.

Hereafter, the present disclosure will be described in more detail through various embodiments. The embodiments are only used to exemplify or illustrate the present disclosure, and the scope of the present disclosure is not limited by these embodiments.

An embodiment of the present disclosure may provide a semiconductor system that performs a self-refresh operation after completing an error check scrub (ECS) operation on all the memory cells of multiple bank groups after the start of entry into a power-down operation.

According to an embodiment of the present disclosure, the occurrence of an error of internal data stored in a memory cell is prevented by performing a self-refresh operation after completing an ECS operation on all the memory cells of multiple bank groups after the start of entry into a power-down operation.

Furthermore, according to an embodiment of the present disclosure, omission of an ECS operation for a memory cell is prevented by performing a self-refresh operation after completing an ECS operation on all the memory cells of multiple bank groups after the start of entry into a power-down operation.

As illustrated in FIG. 1, a semiconductor system 1 according to an embodiment of the present disclosure may include a controller 10 and a semiconductor device 20. The controller 10 may include a command control circuit (CMD CTR) 110 and a data control circuit (DATA CTR) 130. The semiconductor device 20 may include a memory circuit (MEM CT) 330.

The controller 10 may include a first control pin 11_1, a second control pin 11_2, a third control pin 11_3, a fourth control pin 11_4, and a fifth control pin 11_5. The semiconductor device 20 may include a first device pin 21_1, a second device pin 21_2, a third device pin 21_3, a fourth device pin 21_4, and a fifth device pin 21_5. A first transmission line or conductor L11 may be connected between the first control pin 11_1 and the first device pin 21_1. A second transmission line L12 may be connected between the second control pin 11_2 and the second device pin 21_2. A third transmission line L13 may be connected between the third control pin 11_3 and the third device pin 21_3. A fourth transmission line L14 may be connected between the fourth control pin 11_4 and the fourth device pin 21_4. A fifth transmission line L15 may be connected between the fifth control pin 11_5 and the fifth device pin 21_5.

The controller 10 may transmit to the semiconductor device 20 a command CMD for controlling the semiconductor device 20 via the first transmission line L11. The controller 10 may transmit to the semiconductor device 20 an address ADD for controlling the semiconductor device 20 via the second transmission line L12. The controller 10 may transmit, to the semiconductor device 20, a clock signal CLK via the third transmission line L13. The controller 10 may transmit data DATA to the semiconductor device 20 via the fourth transmission line L14. The controller 10 may receive the data DATA from the semiconductor device 20 via the fourth transmission line L14. The controller 10 may transmit a parity PRT signal to the semiconductor device 20 via the fifth transmission line L15. The controller 10 may receive a parity PRT signal from the semiconductor device 20 via the fifth transmission line L15. The command CMD may include multiple bits and may be a signal for controlling operation of the semiconductor device 20. The address ADD may include multiple bits and may be a signal utilized for selecting multiple memory cells that are included in the memory circuit 330. The clock signal CLK may be a signal that is periodically toggled, for example, between a high state and a low state, in order to synchronize operations of the controller 10 and the semiconductor device 20. The data DATA may be common data that are stored in the semiconductor device 20. The parity PRT may include multiple bits and may be a signal that includes error information pertaining to the data DATA.

The command control circuit 110 may output the command CMD and the address ADD for performing a read operation and write operation of an ECS operation after the start of entry into a power-down operation. When the ECS operation is terminated, the command control circuit 110 may output the command CMD to initiate performing a self-refresh operation.

The power-down operation may be an operation that minimizes, by the semiconductor device 20, the consumption of power that is supplied to the semiconductor device 20 by entering a standby mode before starting an operation that inputs and outputs the data DATA. The ECS operation includes correcting one or more errors in internal data (ID<1:8> in FIG. 8) that have been stored in multiple memory cells and storing the internal data (ID<1:8> in FIG. 8), after one or more errors are corrected, optionally and advantageously, at the same memory cell locations where the internal data (ID<1:8> was stored prior to being corrected. A read operation of the ECS operation includes correcting one or more errors in the data DATA that are generated from the internal data (ID<1:8> in FIG. 8) that have been stored in multiple memory cells that are included in the memory circuit 330. A write operation of the ECS operation includes storing, the internal data (ID<1:8> in FIG. 8) that are generated from the data DATA after one or more errors are corrected. The data DATA having one or more errors corrected may optionally and advantageously be stored at the same memory cell locations where the internal data (ID<1:8> was stored prior to being corrected. The self-refresh operation includes sequentially activating multiple word lines that are connected to multiple memory cells in order to sense and amplify the internal data (ID<1:8> in FIG. 8) that have been stored in multiple memory cells and to store the amplified internal data.

The data control circuit 130 may correct one or more errors in the data DATA based on the parity PRT after the start of a read operation of an ECS operation. The data control circuit 130 may store the data DATA after one or more errors in the data DATA are corrected. The data control circuit 130 may output the data DATA with one or more errors corrected after the start of a write operation of the ECS operation.

The controller 10 may output the command CMD and the address ADD for performing an ECS operation and receive the data DATA and the parity PRT, after the start of entry into a power-down operation. When an error occurs in the data DATA, the controller 10 may correct the error of the data DATA and output the data DATA with one or more errors corrected. When the ECS operation is terminated, the controller 10 may output the command CMD for performing a self-refresh operation.

Figure 8:
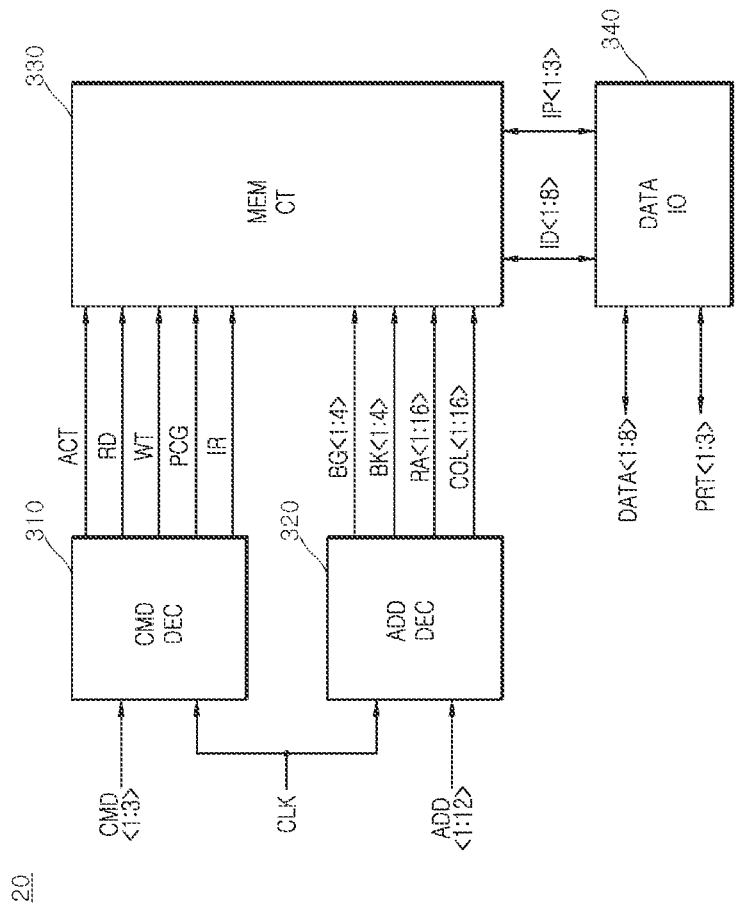
FIG. 8 is a block diagram illustrating an embodiment of a semiconductor device included in the semiconductor system illustrated in FIG. 1.
Figure 9:
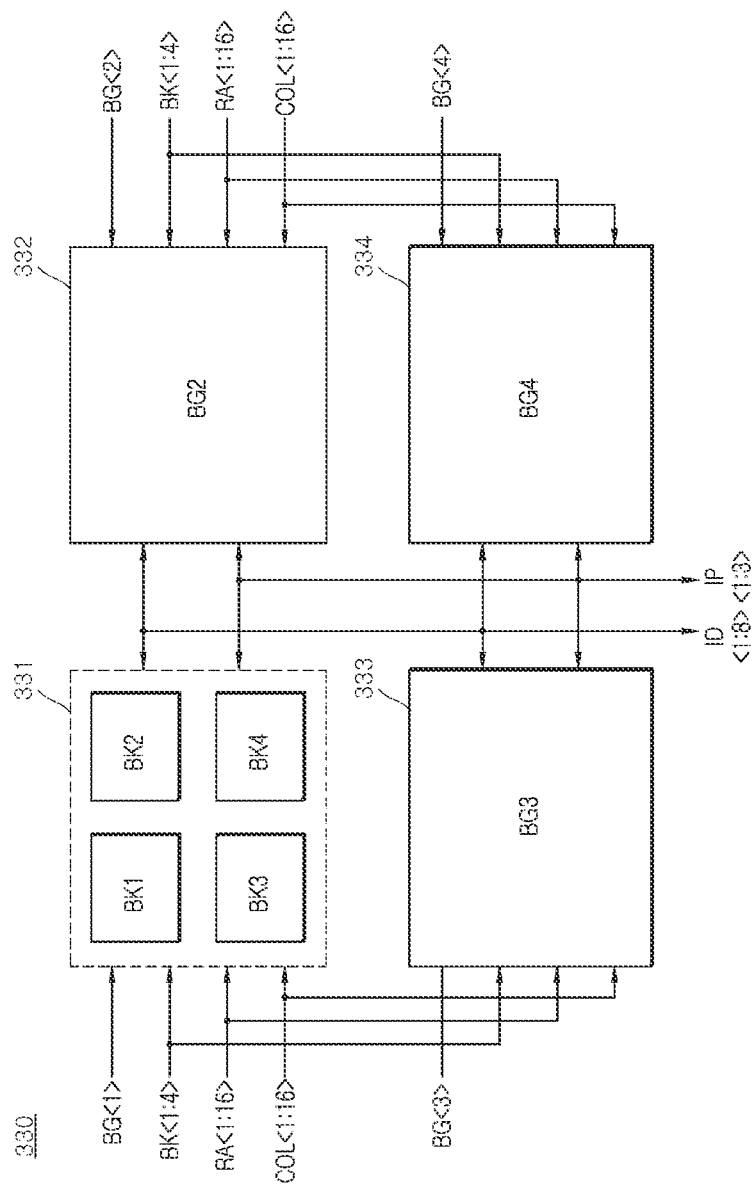
FIG. 9 is a block diagram illustrating an embodiment of a memory circuit included in the semiconductor device illustrated in FIG. 8.

The memory circuit 330 may include multiple bank groups (BG1 to BG4) (331 to 334 in FIG. 9). Each of the multiple bank groups (331 to 334 in FIG. 9) may include multiple banks (BK1 to BK4 in FIG. 9). Each of the multiple banks (BK1 to BK4 in FIG. 9) may include multiple word lines (WL1 to WL16 in FIG. 10) and multiple column lines (YI1 to YI16 in FIG. 10) and may include multiple memory cells (MC in FIG. 10) that are connected to the multiple word lines (WL1 to WL16 in FIG. 10) and the multiple column lines (YI1 to YI16 in FIG. 10). The memory circuit 330 may output the internal data (ID<1:8> in FIG. 8) and internal parities IP<1:3> in FIG. 8) that have been stored in a memory cell that is selected by the address ADD, among the multiple memory cells (MC in FIG. 10), after the start of a read operation of an ECS operation. The memory circuit 330 may store the internal data (ID<1:8> in FIG. 8) that are generated from the data DATA with one or more errors corrected in a memory cell that is selected by the address ADD, among the multiple memory cells (MC in FIG. 10), after the start of a write operation of the ECS operation.

The semiconductor device 20 may receive the command CMD and the address ADD in synchronization with the clock signal CLK, and may output the internal data (ID<1:8> in FIG. 8) that have been stored in the multiple memory cells (MC in FIG. 10) as the data DATA and output the internal parities IP<1:3> in FIG. 8) that have been stored in the multiple memory cells (MC in FIG. 10) as the parity PRT after the start of a read operation of an ECS operation. The semiconductor device 20 receives the command CMD and the address ADD in synchronization with the clock signal CLK, and receives the data DATA with one or more errors corrected and stores the internal data (ID<1:8> in FIG. 8)

that are generated from the data DATA with error(s) corrected in the multiple memory cells (MC in FIG. 10) after the start of a write operation of the ECS operation. The memory cell (MC in FIG. 10) in which the internal data (ID<1:8> in FIG. 8) are stored after the start of the write operation of the ECS operation may be set as a memory cell (MC in FIG. 10) from which the internal data (ID<1:8> in FIG. 8) are output after the start of the read operation of the ECS operation. In other words, the memory cell (MC in FIG. 10) in which the internal data (ID<1:8> in FIG. 8) are stored after the start of the write operation of the ECS operation may be selected or set as the same memory cell as a memory cell (MC in FIG. 10) from which the internal data (ID<1:8> in FIG. 8) are output after the start of the read operation of the ECS operation. When the ECS operation is terminated, the semiconductor device 20 may receive the command CMD in synchronization with the clock signal CLK and perform a self-refresh operation on the multiple memory cells (MC in FIG. 10).

Figure 2:
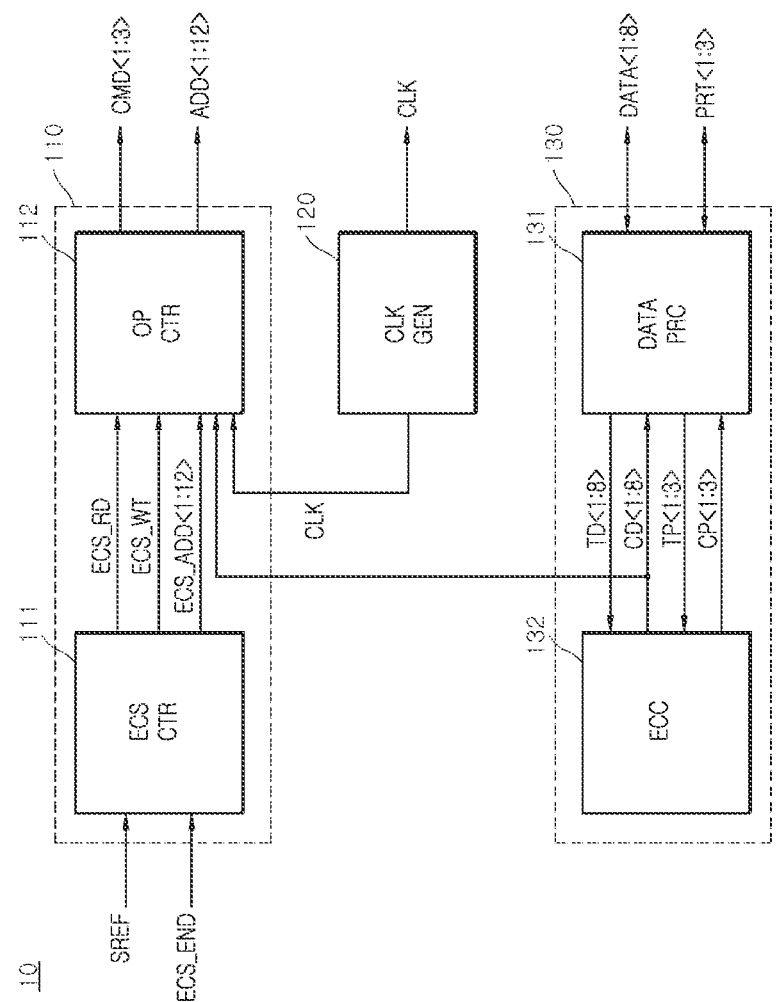
FIG. 2 is a block diagram illustrating an embodiment of a controller included in the semiconductor system illustrated in FIG. 1.

FIG. 2 is a block diagram illustrating an embodiment of the controller 10 included in the semiconductor system 1. The controller 10 may include a command control circuit 110, a clock generation circuit (CLK GEN) 120, and a data control circuit 130.

The command control circuit 110 includes an ECS control circuit (ECS CTR) 111 and an operation control circuit (OP CTR) 112.

The ECS control circuit 111 generates an ECS read signal ECS_RD, an ECS write signal ECS_WT, and first to twelfth ECS addresses ECS_ADD<1:12>, based on a self-refresh signal SREF that is generated after the start of entry into a power-down operation and an ECS end signal ECS_END that is generated after the end of an ECS operation. The ECS control circuit 111 generates the ECS read signal ECS_RD for performing a read operation of the ECS operation from the time at which the self-refresh signal SREF is input until the time at which the ECS end signal ECS_END is input. The ECS control circuit 111 generates the ECS write signal ECS_WT for performing a write operation of the ECS operation. The ECS control circuit 111 generates the first to twelfth ECS addresses ECS_ADD<1:12> that are sequentially applied, utilized, or counted in order to select multiple memory cells after the start of the read operation of the ECS operation and the write operation of the ECS operation.

After the start of an ECS operation, the operation control circuit 112 generates first to third commands CMD<1:3> and first to twelfth addresses ADD<1:12> in synchronization with the clock signal CLK based on the ECS read signal ECS_RD, the ECS write signal ECS_WT, and the first to twelfth ECS addresses ECS_ADD<1:12>. The first to third commands CMD<1:3> initiate performance of a read operation, a write operation, a precharge operation, and a self-refresh operation, for example. The operation control circuit 112 generates the first to third commands CMD<1:3> having a logic level combination for performing a read operation and the first to twelfth addresses ADD<1:12> that are sequentially applied, utilized, or counted, after the start of a read operation of the ECS operation and in synchronization with the clock signal CLK. The operation control circuit 112 generates the first to third commands CMD<1:3> having a logic level combination for performing a write operation and the first to twelfth addresses ADD<1:12> that have same logic level combination. The first to third commands CMD<1:3> and the first to twelfth addresses ADD<1:12> are generated in the read operation of the ECS operation, after the start of a write operation of the ECS operation and in synchronization with the clock signal CLK. When the ECS operation is terminated in synchronization with the clock signal CLK, the operation control circuit 112 generates the first to third commands CMD<1:3> having a logic level combination for performing a precharge operation. The operation control circuit 112 generates, in synchronization with the clock signal CLK, the first to third commands CMD<1:3> for performing a self-refresh operation after the end of the ECS operation. The operation control circuit 112 may generate the first to third commands CMD<1:3> having a logic level combination for performing the self-refresh operation after the end of the ECS operation in synchronization with the clock signal CLK.

The operation control circuit 112 may be implemented to include a common queue circuit and a scheduler (not shown) according to an embodiment. The operation control circuit 112 may sequentially store, in synchronization with the clock signal CLK, first to eighth correction data CD<1:8> having one or more errors corrected and the first to twelfth ECS addresses ECS_ADD<1:12> after the start of a read operation of an ECS operation. The operation control circuit 112 may sequentially output, in synchronization with the clock signal CLK, the first to eighth correction data CD<1:8> that have been stored in the operation control circuit 112 after the start of a write operation of the ECS operation. The operation control circuit 112 outputs the first to twelfth ECS addresses ECS_ADD<1:12> that have been stored in the operation control circuit 112 as the first to twelfth addresses ADD<1:12> after the start of the write operation of the ECS operation and in synchronization with the clock signal CLK. The queue circuit and the scheduler may be included in a common controller and may be implemented to determine the sequence of a read operation and a write operation and output a command and an address for performing the read operation and the write operation according to an operation sequence of the read operation and the write operation.

The clock generation circuit 120 generates the clock signal CLK that is periodically toggled or varied between different states or levels and may, for example, be a square wave or a sine wave. The clock generation circuit 120 may be implemented as a ring oscillator and may generate the clock signal CLK that varies or oscillates at a single frequency or varied frequencies. The clock signal CLK is generally utilized to synchronize timing of operations within the semiconductor system 1, for example, counting and addressing operations.

The data control circuit 130 may include a data processing circuit (DATA PRC) 131 and an error correction circuit (ECC) 132.

The data processing circuit 131 generates first to eighth transfer data TD<1:8> from the first to eighth data DATA<1:8> after the start of a read operation of an ECS operation. The data processing circuit 131 generates first to third transfer parities TP<1:3> from first to third parities PRT<1:3> after the start of the read operation of the ECS operation. The data processing circuit 131 generates the first to eighth data DATA<1:8> from the first to eighth correction data CD<1:8> after the start of a write operation of the ECS operation. The data processing circuit 131 generates first to third parities PRT<1:3> from first to third correction parities CP<1:3> after the start of a write operation of a normal operation.

The error correction circuit ECC 132 generates the first to eighth correction data CD<1:8> by correcting one or more errors included in the first to eighth transfer data TD<1:8>, based on the first to eighth transfer data TD<1:8> and the first to third transfer parities TP<1:3> after the start of a read operation of an ECS operation. The error correction circuit 132 may store the first to eighth correction data CD<1:8> having one or more errors corrected after the start of the read operation of the ECS operation. The error correction circuit 132 outputs the first to eighth correction data CD<1:8> having one or more errors corrected after the start of a write operation of the ECS operation.

Figure 3:
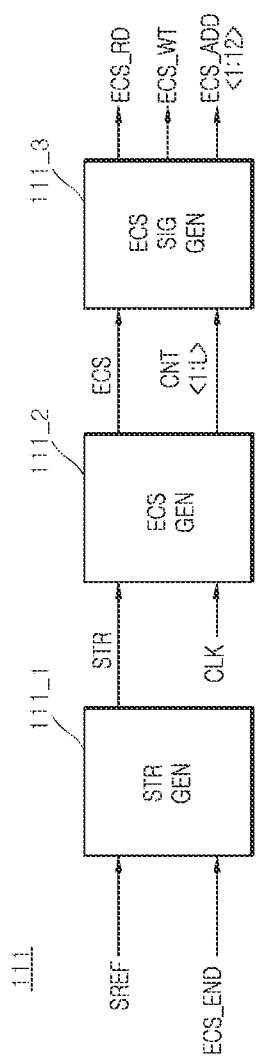
FIG. 3 is a block diagram illustrating an embodiment of an ECS control circuit included in a command control circuit illustrated in FIG. 2.

FIG. 3 is a block diagram illustrating an embodiment of the ECS control circuit 111 included in the command control circuit 110 such as shown in FIG. 1. The ECS control circuit 111 includes a start signal generation circuit (STR GEN) 111_1, an ECS command generation circuit (ECS GEN) 111_2, and an ECS signal generation circuit (ECS SIG GEN) 111_3 in this example.

The start signal generation circuit 111_1 generates a start signal STR, based on the self-refresh signal SREF and an ECS end signal ECS_END. The start signal generation circuit 111_1 generates the start signal STR that is generated from the time at which the self-refresh signal SREF is input to the time at which the ECS end signal ECS_END is input.

The ECS command generation circuit 111_2 generates an ECS command ECS and first to L-th counting signals CNT<1:L>, based on the start signal STR and in synchronization with the clock signal CLK.

The ECS command generation circuit 111_2 generates the ECS command ECS when the start s generated in synchronization with the clock signal CLK. The ECS command generation circuit 111_2 generates the first to L-th counting signals CNT<1:L> that are sequentially counted, beginning when the start signal STR is generated and synchronized with the clock signal CLK.

The ECS signal generation circuit 111_3 generates the ECS read signal ECS_RD, the ECS write signal ECS_WT, and the first to twelfth ECS addresses ECS_ADD<1:12>, based on the ECS command ECS and the first to L-th counting signals CNT<1:L>. The ECS signal generation circuit 111_3 generates the ECS read signal ECS_RD and the ECS write signal ECS_WT that are sequentially generated when the ECS command ECS is generated and the first to L-th counting signals CNT<1:L> are counted, where L is an integer value. The ECS signal generation circuit 111_3 generates the ECS read signal ECS_RD that is generated when the ECS command ECS is generated and the first to L-th counting signals CNT<1:L> are counted according to a first logic level combination. The ECS signal generation circuit 111_3 generates the ECS write signal ECS_WT, when the ECS command ECS is generated and the first to L-th counting signals CNT<1:L> according to a second logic level combination, which second logic level combination has a greater or higher counting value than the first logic level combination. The ECS signal generation circuit 111_3 generates the first to twelfth ECS addresses ECS_ADD<1:12> that are sequentially counted whenever the ECS command ECS is generated and the first to L-th counting signals CNT<1:L> are counted according to the first logic level combination.

Figure 4:
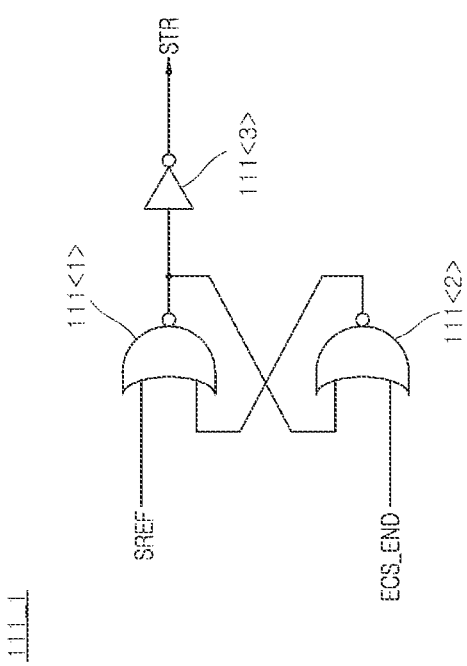
FIG. 4 is a circuit diagram illustrating an embodiment of a start signal generation circuit included in the ECS control circuit illustrated in FIG. 3.

FIG. 4 is a circuit diagram illustrating an embodiment of the start signal generation circuit 111_1 included in the ECS control circuit 111.

The start signal generation circuit 111_1 may be implemented with NOR gates 111<1> and 111<2> and an inverter 111<3>.

The start signal generation circuit 111_1 generates the start signal STR that is generated at a logic high level at the time when the self-refresh signal SREF is input at a logic high level, for example, when the self-refresh signal SREF transitions from a logic low level to a logic high level. The start signal generation circuit 111_1 generates the start signal STR at a logic low level at the time when the self-refresh signal SREF is input at a logic low level and the ECS end signal ECS_END is input at a logic high level.

Figure 5:
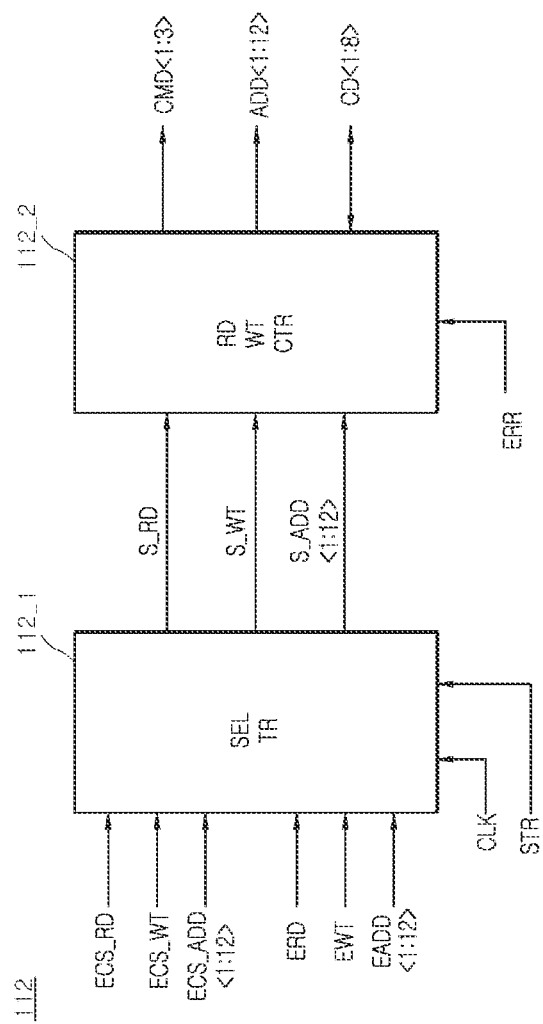
FIG. 5 is a block diagram illustrating an embodiment of an operation control circuit included in the command control circuit illustrated in FIG. 2.

FIG. 5 is a block diagram illustrating an embodiment of the operation control circuit 112 included in the command control circuit 110 such as shown in FIG. 1. The operation control circuit 112 may include a selection transfer circuit (SEL TR) 112_1 and a read write control circuit (RD WT CTR) 112_2.

The selection transfer circuit 112_1 generates a selection read signal S_RD, a selection write signal S_WT, and first to twelfth selection addresses S_ADD<1:12>, based on the ECS read signal ECS_RD, the ECS write signal ECS_WT, and the first to twelfth ECS addresses ECS_ADD<1:12> triggered by the start signal STR, an external read signal ERD, an external write signal EWT, and first to twelfth external addresses EADD<1:12> in synchronization with the clock signal CLK. When the start signal STR is generated at a logic high level in synchronization with the clock signal CLK, the selection transfer circuit 112_1 outputs the ECS read signal ECS_RD as the selection read signal S_RD, outputs the ECS write signal ECS_WT as the selection write signal S_WT, and outputs the first to twelfth ECS addresses ECS_ADD<1:12> as the first to twelfth selection addresses S_ADD<1:12>. When the start signal STR is generated at a logic low level in synchronization with the clock signal CLK, the selection transfer circuit 112_1 outputs the external read signal ERD as the selection read signal S_RD, outputs the external write signal EWT as the selection write signal S_WT, and outputs the first to twelfth external addresses EADD<1:12> as the first to twelfth selection addresses S_ADD<1:12>.

The read write control circuit 112_2 generates the first to third commands CMD<1:3> for performing a read operation, based on the selection read signal S_RD and the selection write signal S_WT that are generated from the ECS read signal ECS_RD and the ECS write signal ECS_WT after the start of the read operation of the ECS operation. The read write control circuit 112_2 generates the first to third commands CMD<1:3> for performing a write operation, based on the selection read signal S_RD and the selection write signal S_WT that are generated from the ECS read signal ECS_RD and the ECS write signal ECS_WT after the start of a write operation of the ECS operation. The read write control circuit 112_2 outputs the first to twelfth selection addresses S_ADD<1:12> that are generated from the first to twelfth ECS addresses ECS_ADD<1:12> as the first to twelfth addresses ADD<1:12> after the start of the read operation and write operation of the ECS operation. When an error detection signal ERR is detected after the start of the read operation of the ECS operation, the read write control circuit 112_2 blocks the generation of the first to third commands CMD<1:3> for performing the write operation of the ECS operation.

The read write control circuit 112_2 generates the first to third commands CMD<1:3> for performing a precharge operation after the end of an ECS operation. The read write control circuit 112_2 may generate the first to third commands CMD<1:3> for performing a self-refresh operation after generating the first to third commands CMD<1:3> for performing the precharge operation.

The read write control circuit 112_2 may be implemented to include a common queue circuit and a scheduler according to an embodiment. The read write control circuit 112_2 may sequentially store the first to eighth correction data CD<1:8> with one or more errors corrected and the first to twelfth selection addresses S_ADD<1:12> after the start of a read operation of an ECS operation. The read write control circuit 112_2 may sequentially output the first to eighth correction data CD<1:8> and the first to twelfth selection addresses S_ADD<1:12> that have been stored in the read write control circuit 112_2, after the start of a write operation of the ECS operation.

Figure 6:
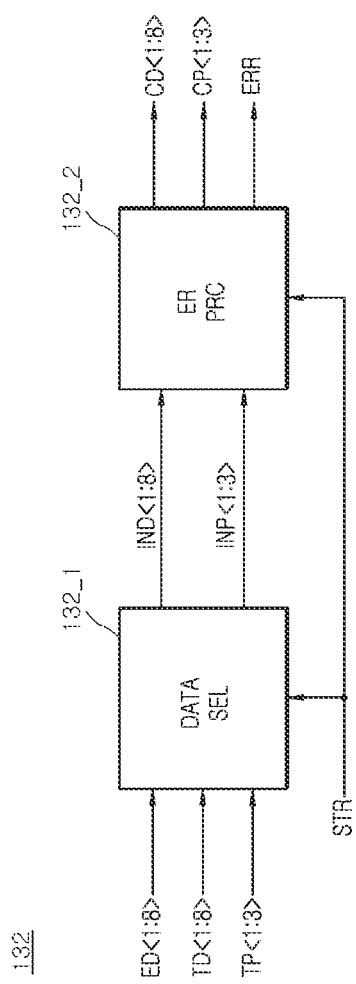
FIG. 6 is a block diagram illustrating an embodiment of an error correction circuit included in a data control circuit illustrated in FIG. 2.

FIG. 6 is a block diagram illustrating an embodiment of the error correction circuit 132 included in the data control circuit 130. The error correction circuit 132 may include a data selection circuit (DATA SEL) 132_1 and an error processing circuit (ER PRC) 132_2.

The data selection circuit 132_1 generates the first to eighth input data IND<1:8> based on the first to eighth transfer data TD<1:8> triggered by the start signal STR and first to eighth external data ED<1:8>. The data selection circuit 132_1 outputs the first to eighth transfer data TD<1:8> as the first to eighth input data IND<1:8> when the start signal STR is generated at a logic high level. The data selection circuit 132_1 outputs the first to eighth external data ED<1:8> as the first to eighth input data IND<1:8> when the start signal STR is generated at a logic low level. The data selection circuit 132_1 generates first to third input parities INP<1:3> based on first to third transfer parities TP<1:3> triggered by the start signal STR. The data selection circuit 132_1 outputs the first to third transfer parities TP<1:3> as the first to third input parities INP<1:3> when the start signal STR is generated at a logic high level. The first to eighth external data ED<1:8> data are data that are input to the semiconductor system 1 from a host, such as an external device to the semiconductor system 1, in order to perform a write operation of a normal operation.

The error processing circuit 132_2 generates the error detection signal ERR in response to detecting an error included in the first to eighth input data IND<1:8> by performing an ECC encoding operation and an ECC decoding operation based on the first to eighth input data IND<1:8> and the first to third input parities INP<1:3> after the start of a read operation of an ECS operation. The error processing circuit 132_2 generates the first to eighth correction data CD<1:8> by correcting one or more errors included in the first to eighth input data IND<1:8> by performing the ECC encoding operation and the ECC decoding operation based on the first to eighth input data IND<1:8> and the first to third input parities INP<1:3> after the start of the read operation of the ECS operation. The error processing circuit 132_2 stores the first to eighth correction data CD<1:8> after the start of the read operation of the ECS operation. The error processing circuit 132_2 generates the first to eighth correction data CD<1:8> from the first to eighth input data IND<1:8> after the start of a write operation of a normal operation. The error processing circuit 132_2 generates the first to third correction parities CP<1:3> that include error information within the first to eighth input data IND<1:8> by performing the ECC encoding operation based on the first to eighth input data IND<1:8> when the start signal STR is at a logic low level after the start of the write operation of the normal operation. The ECC encoding operation may be an operation of a common error correction circuit, which operation generates a parity bit by comparing the bits of data by using an ECC. The ECC decoding operation may be an operation of the common error correction circuit, which operation generates a syndrome bit by comparing the parity bit of data generated in an ECC encoding operation and a parity bit generated at a previous time by applying an ECC and correcting an error included in the data by decoding the syndrome bit.

Figure 7:
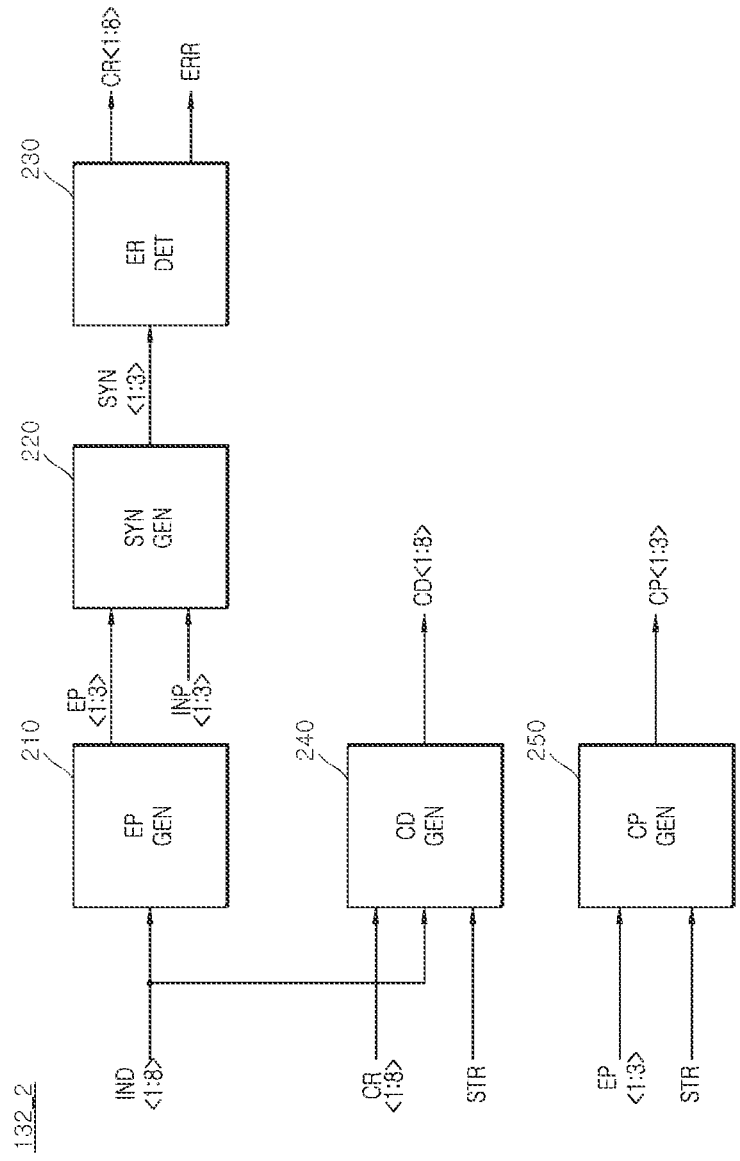
FIG. 7 is a block diagram illustrating an embodiment of an error processing circuit included in the error correction circuit illustrated in FIG. 6.

FIG. 7 is a block diagram illustrating an embodiment of the error processing circuit 132_2 included in the error correction circuit 132. The error processing circuit 132_2 may include an operation parity generation circuit (EP GEN) 210, a syndrome generation circuit (SYN GEN) 220, an error detection circuit (ER DET) 230, a correction data generation circuit (CD GEN) 240, and a correction parity generation circuit (CP GEN) 250.

The operation parity generation circuit 210 generates first to third operation parities EP<1:3> by performing an ECC encoding operation based on the first to eighth input data IND<1:8>. The error processing circuit 132_2 may generate the first to third operation parities EP<1:3> by performing the ECC encoding operation based on the first to eighth input data IND<1:8> that are generated from the first to eighth transfer data TD<1:8> after the start of a read operation of an ECS operation. The error processing circuit 132_2 generates the first to third operation parities EP<1:3> by performing the ECC encoding operation based on the first to eighth input data IND<1:8> that are generated from the first to eighth external data ED<1:8> after the start of a write operation of the normal operation.

The syndrome generation circuit 220 generates first to third syndromes SYN<1:3> based on the first to third operation parities EP<1:3> and the first to third input parities INP<1:3> after the start of a read operation of an ECS operation. The syndrome generation circuit 220 generates the first to third syndromes SYN<1:3> by comparing the first to third operation parities EP<1:3> and the first to third input parities INP<1:3> after the start of the read operation of the ECS operation.

The error detection circuit 230 generates first to eighth error correction signals CR<1:8> by performing an ECC decoding operation on the first to third syndromes SYN<1:3>. The error detection circuit 230 generates the error detection signal ERR at a logic high level when at least one of the first to eighth error correction signals CR<1:8> is generated at a logic high level. When one or more of the first to eighth error correction signals CR<1:8> is generated at a logic high level, at least one error occurs or exists in the first to eighth input data IND<1:8>.

The correction data generation circuit 240 generates the first to eighth correction data CD<1:8> by correcting one or more errors in the first to eighth input data IND<1:8> based on the first to eighth error correction signals CR<1:8>. The correction data generation circuit 240 generates the first to eighth correction data CD<1:8> by correcting one or more errors of the first to eighth input data IND<1:8> based on the first to eighth error correction signals CR<1:8> when the start signal STR is generated at a logic high level after the start of a read operation of an ECS operation. For example, when the first error correction signal CR<1> is generated at a logic high level, the correction data generation circuit 240 generates the first to eighth correction data CD<1:8> by inverting the logic level of the first input data IND<1>, among the first to eighth input data IND<1:8>, and not inverting the logic levels of the second to eighth input data IND<2:8>. When the first error correction signal CR<1> is generated at a logic high level, an error occurs in the first input data IND<1> among the first to eighth input data IND<1:8>. The correction data generation circuit 240 stores the first to eighth correction data CD<1:8> having all errors corrected in the first to eighth input data IND<1:8>. The correction data generation circuit 240 may output the first to eighth correction data CD<1:8> having the errors corrected after the start of a write operation of the ECS operation. The correction data generation circuit 240 may output the first to eighth input data IND<1:8> as the first to eighth correction data CD<1:8> when the start signal STR is generated at a logic low level after the start of a write operation of a normal operation.

The correction parity generation circuit 250 outputs the first to third operation parities EP<1:3> as the first to third correction parities CP<1:3> after the start of a write operation of a normal operation. The correction parity generation circuit 250 outputs, as the first to third correction parities CP<1:3>, the first to third operation parities EP<1:3> that are generated by performing an ECC encoding operation on the first to eighth input data IND<1:8> that are generated from the first to eighth external data ED<1:8> when the start signal STR is generated at a logic low level after the start of the write operation of the normal operation.

FIG. 8 is a block diagram illustrating an embodiment of the semiconductor device 20 included in the semiconductor system 1. The semiconductor device 20 may include a command decoder (CMD DEC) 310, an address decoder (ADD DEC) 320, a memory circuit (MEM CT) 330, and a data input and output circuit (DATA IO) 340.

The command decoder 310 generates an active signal ACT, a read signal RD, a write signal WT, a precharge signal PCG, and an internal refresh signal IR after decoding the first to third commands CMD<1:3>. The command decoder 310 generates the active signal ACT by decoding the first to third commands CMD<1:3> for performing an active operation before performing a read operation and write operation of an ECS operation. The command decoder 310 generates the read signal RD by decoding the first to third commands CMD<1:3> for performing the read operation of the ECS operation. The command decoder 310 generates the read signal RD by decoding the first to third commands CMD<1:3> for performing a read operation of a normal operation. The command decoder 310 generates the write signal WT by decoding the first to third commands CMD<1:3> for performing the write operation of the ECS operation. The command decoder 310 generates the write signal WT by decoding the first to third commands CMD<1:3> for performing a write operation of the normal operation. The command decoder 310 generates the precharge signal PCG by decoding the first to third commands CMD<1:3> for performing a precharge operation when the read operation and write operation of the ECS operation are terminated. The command decoder 310 generates the internal refresh signal IR by decoding the first to third commands CMD<1:3> for performing a self-refresh operation when the precharge operation is terminated during the ECS operation.

The address decoder 320 generates first to fourth bank group addresses BG<1:4>, first to fourth bank addresses BK<1:4>, first to sixteenth row addresses RA<1:16>, and first to sixteenth column addresses COL<1:16> by decoding the first to twelfth addresses ADD<1:12>.

The address decoder 320 generates the first to fourth bank group addresses BG<1:4>, the first to fourth bank addresses BK<1:4>, the first to sixteenth row addresses RA<1:16>, and the first to sixteenth column addresses COL<1:16> that are sequentially counted by decoding the first to twelfth addresses ADD<1:12> after the start of a read operation of an ECS operation in synchronization with the clock signal CLK. For example, the address decoder 320 generates the first to sixteenth column addresses COL<1:16> that are sequentially counted when the first bank group address BG<1> is activated, the first bank address BK<1> is activated, and the first row address RA<1> is activated after the start of the read operation of the ECS operation. The address decoder 320 generates the second row address RA<2> by activating the second row address RA<2> after the first to sixteenth column addresses COL<1:16> are activated up to the sixteenth column address COL<16> after the start of the read operation of the ECS operation. The address decoder 320 generates the second bank address BK<2> by activating the second bank address BK<2> after the first to sixteenth row addresses RA<1:16> are activated up to the sixteenth row address RA<16> after the start of the read operation of the ECS operation. The address decoder 320 generates the second bank group address BG<2> by activating the second bank group address BG<2> after the first to fourth bank addresses BK<1:4> are activated up to the fourth bank address BK<4> after the start of the read operation of the ECS operation. Advantageously, each bank group address is activated one at a time, in other words, only one bank group address is activated while the remaining back group addresses are deactivated, which may, for example, reduce precharge time for each bank and improve self-refresh operations.

The memory circuit 330 performs an active operation for activating the word lines (WL1 to WL16 in FIG. 10) based on the first to fourth bank group addresses BG<1:4>, the first to fourth bank addresses BK<1:4>, and the first to sixteenth row addresses RA<1:16> when the active signal ACT is generated. The memory circuit 330 outputs the first to eighth internal data ID<1:8> and the first to third internal parities IP<1:3> stored in a memory cell (MC in FIG. 10) by activating the column lines (YI1 to YI16 in FIG. 10) based on the first to fourth bank group addresses BG<1:4>, the first to fourth bank addresses BK<1:4>, the first to sixteenth row addresses RA<1:16>, and the first to sixteenth column addresses COL<1:16> when the read signal RD is generated. The memory circuit 330 stores the first to eighth internal data ID<1:8> and the first to third internal parities IP<1:3> in a memory cell (MC in FIG. 10) by activating the column lines (YI1 to YI16 in FIG. 10) based on the first to fourth bank group addresses BG<1:4>, the first to fourth bank addresses BK<1:4>, the first to sixteenth row addresses RA<1:16>, and the first to sixteenth column addresses COL<1:16> when the write signal WT is generated. The memory circuit 330 performs a precharge operation when the precharge signal PCG is generated. The precharge operation may be a precharge operation as known in the semiconductor industry. The memory circuit 330 performs a self-refresh operation for sequentially activating the word lines (WL1 to WL16 in FIG. 10), based on the first to fourth bank group addresses BG<1:4>, the first to fourth bank addresses BK<1:4>, and the first to sixteenth row addresses RA<1:16> that are sequentially counted in synchronization with the clock signal CLK when the internal refresh signal IR is generated.

The data input and output circuit 340 outputs the first to eighth internal data ID<1:8> as the first to eighth data DATA<1:8> and outputs the first to third internal parities IP<1:3> as the first to third parities PRT<1:3> after the start of a read operation of an ECS operation. The data input and output circuit 340 outputs the first to eighth internal data ID<1:8> as the first to eighth data DATA<1:8> and outputs the first to third internal parities IP<1:3> as the first to third parities PRT<1:3> after the start of a read operation of a normal operation. The data input and output circuit 340 outputs the first to eighth data DATA<1:8> as the first to eighth internal data ID<1:8> after the start of a write operation of the ECS operation. The data input and output circuit 340 outputs the first to eighth data DATA<1:8> as the first to eighth internal data ID<1:8> and outputs the first to third parities PRT<1:3> as the first to third internal parities IP<1:3> after the start of a write operation of the normal operation.

FIG. 9 is a block diagram illustrating an embodiment of the memory circuit 330 included in the semiconductor device 20. The memory circuit 330 may include a first bank group 331, a second bank group (BG2) 332, a third bank group (BG3) 333, and a fourth bank group (BG4) 334.

The first bank group 331 includes first to fourth banks BK1 to BK4 in this example.

The first bank group 331 activates the word lines (WL1 to WL16 in FIG. 10) that are selected by the first to fourth bank addresses BK<1:4> and the first to sixteenth row addresses RA<1:16> when the first bank group address BG<1> is activated after the start of an active operation.

The first bank group 331 outputs the first to eighth internal data ID<1:8> and the first to third internal parities IP<1:3> stored in the memory cells (MC in FIG. 10) that are connected to the column lines (YI1 to YI16 in FIG. 10) that are selected by the first to fourth bank addresses BK<1:4>, the first to sixteenth row addresses RA<1:16>, and the first to sixteenth column addresses COL<1:16> that are sequentially counted when the first bank group address BG<1> is activated after the start of a read operation of an ECS operation. The first bank group 331 outputs the first to eighth internal data ID<1:8> and the first to third internal parities IP<1:3> that are stored in the memory cells (MC in FIG. 10) that are connected to the column lines (YI1 to YI16 in FIG. 10) that are selected by the first to fourth bank addresses BK<1:4>, the first to sixteenth row addresses RA<1:16>, and the first to sixteenth column addresses COL<1:16> when the first bank group address BG<1> is activated after the start of a read operation of a normal operation.

The first bank group 331 stores the first to eighth internal data ID<1:8> in the memory cells (MC in FIG. 10) that are connected to the column lines (YI1 to YI16 in FIG. 10) that are selected by the first to fourth bank addresses BK<1:4>, the first to sixteenth row addresses RA<1:16>, and the first to sixteenth column addresses COL<1:16> that are sequentially counted when the first bank group address BG<1> is activated after the start of a write operation of an ECS operation. The first bank group 331 stores the first to eighth internal data ID<1:8> and the first to third internal parities IP<1:3> in the memory cells (MC in FIG. 10) that are connected to the column lines (YI1 to YI16 in FIG. 10) that are selected by the first to fourth bank addresses BK<1:4>, the first to sixteenth row addresses RA<1:16>, and the first to sixteenth column addresses COL<1:16> when the first bank group address BG<1> is activated after the start of a write operation of a normal operation.

The first bank group 331 performs a precharge operation in response to receiving precharge signal PCG.

The first bank group 331 performs a self-refresh operation for sequentially activating the word lines (WL1 to WL16 in FIG. 10) based on the first to fourth bank group addresses BG<1:4>, the first to fourth bank addresses BK<1:4>, and the first to sixteenth row addresses RA<1:16> that are sequentially counted when the internal refresh signal IR is generated.

Each of the second to fourth bank groups 332 to 334 may be implemented with the same construction as the first bank group 331 except that each of the second to fourth bank groups 332 to 334 operates when each of the second to fourth bank group addresses BG<2:4> is activated, and advantageously performs the same operations as the first bank group 331, as described above.

Figure 10:
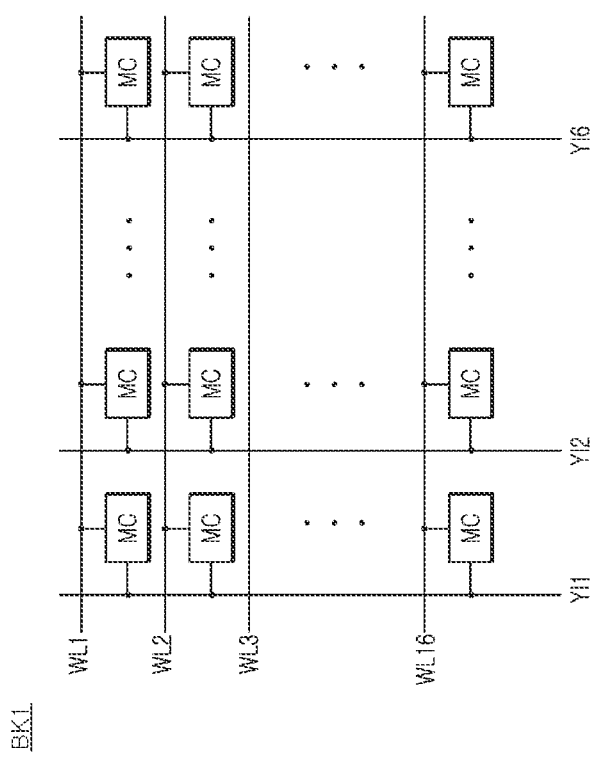
FIG. 10 is a diagram illustrating an embodiment of a first bank included in a first bank group illustrated in FIG. 9.

FIG. 10 is a diagram illustrating an embodiment of the first bank BK1 included in the first bank group 331.

The first bank BK1 includes the first to sixteenth word lines WL1 to WL16 and the first to sixteenth column lines YI1 to YI16. The first bank BK1 includes multiple memory cells MC at which the first to sixteenth word lines WL1 to WL16 and the first to sixteenth column lines YI1 to YI16 are intersected and which are connected to the first to sixteenth word lines WL1 to WL16 and the first to sixteenth column lines YI1 to YI16.

In the first bank BK1, when the first bank address BK<1> is activated, any one of the first to sixteenth word lines WL1 to WL16 is activated by the first to sixteenth row addresses RA<1:16>. In the first bank BK1, when the first bank address BK<1> is activated, any one of the first to sixteenth column lines YI1 to YI16 is activated by the corresponding first to sixteenth column addresses COL<1:16>.

The first bank BK1 outputs the first to eighth internal data ID<1:8> and the first to third internal parities IP<1:3> stored in a memory cell MC that is connected to an activated word line and an activated column line after the start of a read operation of an ECS operation. The first bank BK1 stores the first to eighth internal data ID<1:8> in a memory cell MC that is connected to an activated word line and an activated column line after the start of a write operation of the ECS operation.

The first bank BK1 outputs the first to eighth internal data ID<1:8> and the first to third internal parities IP<1:3> stored in a memory cell MC that is connected to an activated word line and an activated column line after the start of a read operation of a normal operation. The first bank BK1 stores the first to eighth internal data ID<1:8> and the first to third internal parities IP<1:3> in a memory cell MC that is connected to an activated word line and an activated column line after the start of a write operation of the normal operation.

The first bank BK1 may perform a precharge operation after a normal operation.

The first bank BK1 sequentially activates the word lines (WL1 to WL16 in FIG. 10) based on the first to sixteenth row addresses RA<1:16> that are sequentially counted after the start of a self-refresh operation.

Figure 11:
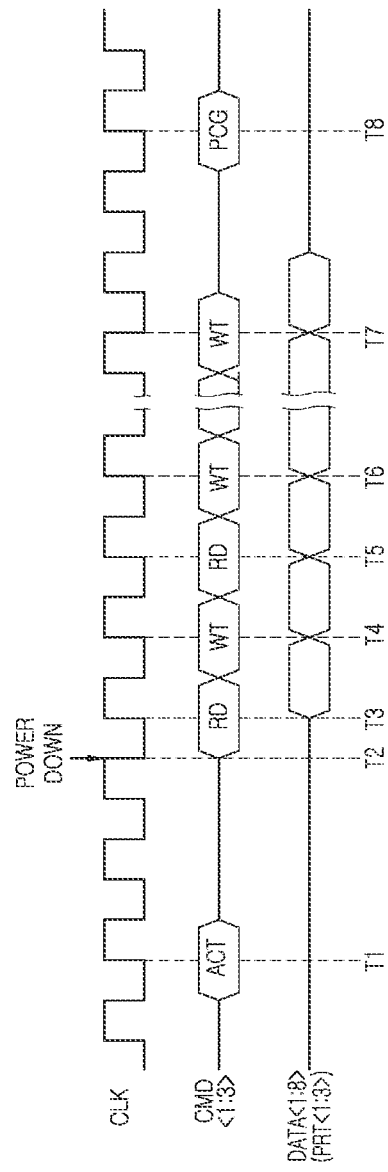
FIG. 11 and FIG. 12 are timing diagrams illustrating an ECS operation of the semiconductor system according to an embodiment of the present disclosure.

FIG. 11 is a timing diagram illustrating an ECS operation of the semiconductor system according to an embodiment of the present disclosure. The timing of an ECS operation according to an embodiment of the present disclosure is shown, wherein an operation of sequentially performing ECS operations on multiple memory cells that are included in the first to fourth bank groups 331 to 334 may be described as follows with reference to FIG. 11.

Before performing the ECS operation, the controller 10 outputs the first to third commands CMD<1:3> for performing an active operation, such as a read operation, a write operation, and a precharge operation.

At time T1, the command decoder 310 of the semiconductor device 20 generates the active signal ACT after decoding the first to third commands CMD<1:3>.

At time T2, a power-down operation POWER DOWN is entered. The ECS control circuit 111 of the controller 10 may sequentially generate the ECS read signal ECS_RD for performing a read operation of an ECS operation, the ECS write signal ECS_WT for performing a write operation of the ECS operation, and the first to twelfth ECS addresses ECS_ADD<1:12> that are sequentially counted in order to select multiple memory cells after the start of the read operation of the ECS operation and the write operation of the ECS operation from time T2, based on the self-refresh signal SREF that is generated after the start of the entry into the power-down operation.

The operation control circuit 112 of the controller 10 generates the first to third commands CMD<1:3> and the first to twelfth addresses ADD<1:12> based on the ECS read signal ECS_RD, the ECS write signal ECS_WT, and the first to twelfth ECS addresses ECS_ADD<1:12> after the start of the ECS operation in synchronization with the clock signal CLK.

At time T3, the command decoder 310 of the semiconductor device 20 generates the read signal RD after decoding the first to third commands CMD<1:3>.

The address decoder 320 of the semiconductor device 20 generates the first bank group address BG<1>, the first bank address BK<1>, the first row address RA<1>, and the first column address COL<1> that are activated by decoding the first to twelfth addresses ADD<1:12>.

The first word line WL1 and the first column line YI1 that are included in the first bank BK1 of the first bank group 331 of the semiconductor device 20 are activated by the first bank group address BG<1>, the first bank address BK<1>, the first row address RA<1>, and the first column address COL<1>. The first bank BK1 of the first bank group 331 may output the first to eighth internal data ID<1:8> and the first to third internal parities IP<1:3> stored in a memory cell MC that is connected to the first word line WL1 and the first column line YI1 that are activated after the start of the read operation of the ECS operation.

The data input and output circuit 340 of the semiconductor device 20 outputs the first to eighth internal data ID<1:8> as the first to eighth data DATA<1:8> and outputs the first to third internal parities IP<1:3> as the first to third parities PRT<1:3> after the start of the read operation of the ECS operation.

The data processing circuit 131 of the controller 10 generates the first to eighth transfer data TD<1:8> from the first to eighth data DATA<1:8> after the start of the read operation of the ECS operation. The data processing circuit 131 generates the first to third transfer parities TP<1:3> from the first to third parities PRT<1:3> after the start of the read operation of the ECS operation.

The error correction circuit 132 of the controller 10 generates the first to eighth correction data CD<1:8> in response to correcting one or more errors in the first to eighth transfer data TD<1:8>, based on the first to eighth transfer data TD<1:8> and the first to third transfer parities TP<1:3> after the start of the read operation of the ECS operation. The error correction circuit 132 stores the first to eighth correction data CD<1:8> having one or more errors corrected after the start of the read operation of the ECS operation.

At time T4, the error correction circuit 132 of the controller 10 outputs the first to eighth correction data CD<1:8> having one or more errors corrected after the start of the write operation of the ECS operation.

The data processing circuit 131 of the controller 10 generates the first to eighth data DATA<1:8> from the first to eighth correction data CD<1:8> after the start of the write operation of the ECS operation.

The command decoder 310 of the semiconductor device 20 generates the write signal WT after decoding the first to third commands CMD<1:3>.

The address decoder 320 of the semiconductor device 20 generates the first bank group address BG<1>, the first bank address BK<1>, the first row address RA<1>, and the first column address COL<1> that are activated by decoding the first to twelfth addresses ADD<1:12>.

The data input and output circuit 340 of the semiconductor device 20 outputs the first to eighth data DATA<1:8> as the first to eighth internal data ID<1:8> after the start of the write operation of the ECS operation.

The first word line WL1 and the first column line YI1 that are included in the first bank BK1 of the first bank group 331 of the semiconductor device 20 are activated by the first bank group address BG<1>, the first bank address BK<1>, the first row address RA<1>, and the first column address COL<1>. The first bank BK1 of the first bank group 331 stores the first to eighth internal data ID<1:8> in a memory cell MC that is connected to the activated word line and the activated column line after the start of the write operation of the ECS operation.

At time T5, the command decoder 310 of the semiconductor device 20 generates the read signal RD after decoding the first to third commands CMD<1:3>.

The address decoder 320 of the semiconductor device 20 generates the first bank group address BG<1>, the first bank address BK<1>, the first row address RA<1>, and the second column address COL<2> that are activated by decoding the first to twelfth addresses ADD<1:12>.

The first word line WL1 and the second column line YI2 that are included in the first bank BK1 of the first bank group 331 of the semiconductor device 20 are activated by the first bank group address BG<1>, the first bank address BK<1>, the first row address RA<1>, and the second column address COL<2>. The first bank BK1 of the first bank group 331 outputs the first to eighth internal data ID<1:8> and the first to third internal parities IP<1:3> stored in the memory cell MC connected to the first word line WL1 and the second column line YI2 that are activated after the start of the read operation of the ECS operation.

The data input and output circuit 340 of the semiconductor device 20 outputs the first to eighth internal data ID<1:8> as the first to eighth data DATA<1:8> and outputs the first to third internal parities IP<1:3> as the first to third parities PRT<1:3> after the start of the read operation of the ECS operation.

The data processing circuit 131 of the controller 10 generates the first to eighth transfer data TD<1:8> from the first to eighth data DATA<1:8> after the start of the read operation of the ECS operation. The data processing circuit 131 generates the first to third transfer parities TP<1:3> from the first to third parities PRT<1:3> after the start of the read operation of the ECS operation.

The error correction circuit 132 of the controller 10 generates the first to eighth correction data CD<1:8> by correcting one or more errors in the first to eighth transfer data TD<1:8>, based on the first to eighth transfer data TD<1:8> and the first to third transfer parities TP<1:3> after the start of the read operation of the ECS operation. The error correction circuit 132 stores the first to eighth correction data CD<1:8> having one or more errors corrected after the start of the read operation of the ECS operation.

At time T6, the error correction circuit 132 of the controller 10 outputs the first to eighth correction data CD<1:8> having one or more errors corrected after the start of the write operation of the ECS operation.

The data processing circuit 131 of the controller 10 generates the first to eighth data DATA<1:8> from the first to eighth correction data CD<1:8> after the start of the write operation of the ECS operation.

The command decoder 310 of the semiconductor device 20 generates the write signal WT after decoding the first to third commands CMD<1:3>.

The address decoder 320 of the semiconductor device 20 generates the first bank group address BG<1>, the first bank address BK<1>, the first row address RA<1>, and the second column address COL<2> that are activated by decoding the first to twelfth addresses ADD<1:12>.

The data input and output circuit 340 of the semiconductor device 20 outputs the first to eighth data DATA<1:8> as the first to eighth internal data ID<1:8> after the start of the write operation of the ECS operation.

The first word line WL1 and the second column line YI2 that are included in the first bank BK1 of the first bank group 331 of the semiconductor device 20 are activated by the first bank group address BG<1>, the first bank address BK<1>, the first row address RA<1>, and the second column address COL<2>. The first bank BK1 of the first bank group 331 stores the first to eighth internal data ID<1:8> in a memory cell MC that is connected to the first word line WL1 and the second column line YI2 that are activated after the start of the write operation of the ECS operation.

Thereafter, the controller 10 and the semiconductor device 20 sequentially performs a read operation and write operation of an ECS operation identically with the operations from time T3 to time T6.

At time T7, the error correction circuit 132 of the controller 10 outputs the first to eighth transfer data TD<1:8> having one or more errors corrected as the first to eighth correction data CD<1:8> after the start of the write operation of the ECS operation.

The data processing circuit 131 of the controller 10 generates the first to eighth data DATA<1:8> from the first to eighth correction data CD<1:8> after the start of the write operation of the ECS operation.

The command decoder 310 of the semiconductor device 20 generates the write signal WT after decoding the first to third commands CMD<1:3>.

The address decoder 320 of the semiconductor device 20 generates the fourth bank group address BG<4>, the fourth bank address BK<4>, the sixteenth row address RA<16>, and the sixteenth column address COL<16> that are activated by decoding the first to twelfth addresses ADD<1:12>.

The data input and output circuit 340 of the semiconductor device 20 outputs the first to eighth data DATA<1:8> as the first to eighth internal data ID<1:8> after the start of the write operation of the ECS operation.

The sixteenth word line WL16 and the sixteenth column line YI16 that are included in the fourth bank BK4 of the fourth bank group 334 of the semiconductor device 20 are activated by the fourth bank group address BG<4>, the fourth bank address BK<4>, the sixteenth row address RA<16>, and the sixteenth column address COL<16>. The fourth bank BK4 of the fourth bank group 334 stores the first to eighth internal data ID<1:8> in a memory cell MC connected to the sixteenth word line WL16 and the sixteenth column line YI16 that are activated after the start of the write operation of the ECS operation. At timing T7, the ECS operation for the multiple memory cells MC that are included in the first to fourth bank groups 331 to 334 is completed.

The controller 10 outputs the first to third commands CMD<1:3> for performing a precharge operation when the ECS operation is completed.

At time T8, the command decoder 310 of the semiconductor device 20 generates the precharge signal PCG after decoding the first to third commands CMD<1:3>.

The address decoder 320 of the semiconductor device 20 generates the first to fourth bank group addresses BG<1:4>, the first to fourth bank addresses BK<1:4>, the first to sixteenth row addresses RA<1:16>, and the first to sixteenth column addresses COL<1:16> that are sequentially counted by decoding the first to twelfth addresses ADD<1:12>.

The semiconductor device 20 performs the precharge operation on the first to fourth bank groups 331 to 334.

The semiconductor system 1 according to the above embodiment of the present disclosure may advantageously prevent the occurrence of an error in internal data stored in a memory cell MC by performing a precharge operation after completing ECS operations for all the memory cells of the first to fourth bank groups 331 to 334 that are included in the semiconductor device 20. The semiconductor system 1 may advantageously prevent the omission of an ECS operation for a memory cell MC by performing a precharge operation after completing ECS operations for all the memory cells of the first to fourth bank groups 331 to 334 that are included in the semiconductor device 20.

Figure 12:
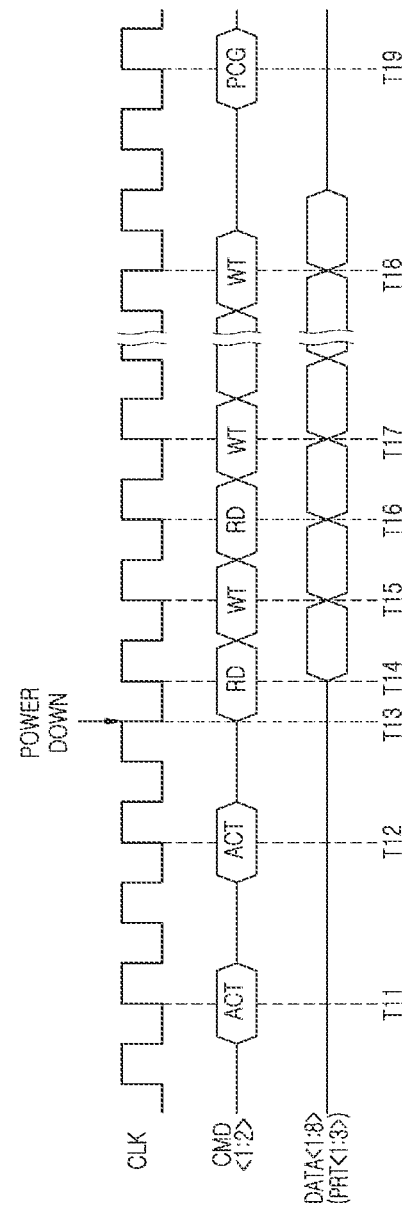

FIG. 12 is a timing diagram illustrating an ECS operation of the semiconductor system according to an embodiment of the present disclosure. The timing of the ECS operation according to an embodiment of the present disclosure is shown, wherein an operation involving performing an ECS operation on a memory cell included in the third bank group 333 after performing an ECS operation on a memory cell included in the first bank group 331 may be described as follows with reference to FIG. 12.

Before performing the ECS operation, the controller 10 outputs the first to third commands CMD<1:3> for performing an active operation on the third bank group 333 after outputting the first to third commands CMD<1:3> for performing an active operation on the first bank group 331.

At time T11, the command decoder 310 of the semiconductor device 20 generates the active signal ACT for performing an active operation on the first bank group 331 after decoding the first to third commands CMD<1:3>.

At time T12, the command decoder 310 of the semiconductor device 20 generates the active signal ACT for performing the active operation on the third bank group 333 after decoding the first to third commands CMD<1:3>.

At time T13, a power-down operation is entered. The ECS control circuit 111 of the controller 10 sequentially generates the ECS read signal ECS_RD for performing a read operation of an ECS operation on the first bank group 331, the ECS write signal ECS_WT for performing a write operation of the ECS operation on the first bank group 331, and the first to twelfth ECS addresses ECS_ADD<1:12> that are sequentially counted in order to select multiple memory cells after the start of the read operation of the ECS operation and the write operation of the ECS operation from time T13, based on the self-refresh signal SREF that is generated after the start of the entry into the power-down operation.

The operation control circuit 112 of the controller 10 generates the first to third commands CMD<1:3> and the first to twelfth addresses ADD<1:12>, based on the ECS read signal ECS_RD, the ECS write signal ECS_WT, and the first to twelfth ECS addresses ECS_ADD<1:12> after the start of the ECS operation in synchronization with the clock signal CLK.

At time T14, the command decoder 310 of the semiconductor device 20 generates the read signal RD after decoding the first to third commands CMD<1:3>.

The address decoder 320 of the semiconductor device 20 generates the first bank group address BG<1>, the first bank address BK<1>, the first row address RA<1>, and the first column address COL<1> that are activated by decoding the first to twelfth addresses ADD<1:12>.

The first word line WL1 and the first column line YI1 that are included in the first bank BK1 of the first bank group 331 of the semiconductor device 20 are activated by the first bank group address BG<1>, the first bank address BK<1>, the first row address RA<1>, and the first column address COL<1>. The first bank BK1 of the first bank group 331 outputs the first to eighth internal data ID<1:8> and the first to third internal parities IP<1:3> stored in a memory cell MC that is connected to the first word line WL1 and the first column line YI1 that are activated after the start of the read operation of the ECS operation.

The data input and output circuit 340 of the semiconductor device 20 outputs the first to eighth internal data ID<1:8> as the first to eighth data DATA<1:8> and outputs the first to third internal parities IP<1:3> as the first to third parities PRT<1:3> after the start of the read operation of the ECS operation.

The data processing circuit 131 of the controller 10 generates the first to eighth transfer data TD<1:8> from the first to eighth data DATA<1:8> after the start of the read operation of the ECS operation. The data processing circuit 131 generates the first to third transfer parities TP<1:3> from the first to third parities PRT<1:3> after the start of the read operation of the ECS operation.

The error correction circuit 132 of the controller 10 generates the first to eighth correction data CD<1:8> by correcting one or more errors in the first to eighth transfer data TD<1:8> based on the first to eighth transfer data TD<1:8> and the first to third transfer parities TP<1:3> after the start of the read operation of the ECS operation. The error correction circuit 132 stores the first to eighth correction data CD<1:8> with one or more errors corrected after the start of the read operation of the ECS operation.

At time T15, the error correction circuit 132 of the controller 10 outputs the first to eighth correction data CD<1:8> having one or more errors corrected after the start of the write operation of the ECS operation.

The data processing circuit 131 of the controller 10 generates the first to eighth data DATA<1:8> from the first to eighth correction data CD<1:8> after the start of the write operation of the ECS operation.

The command decoder 310 of the semiconductor device 20 generates the write signal WT after decoding the first to third commands CMD<1:3>.

The address decoder 320 of the semiconductor device 20 generates the first bank group address BG<1>, the first bank address BK<1>, the first row address RA<1>, and the first column address COL<1> that are activated by decoding the first to twelfth addresses ADD<1:12>.

The data input and output circuit 340 of the semiconductor device 20 outputs the first to eighth data DATA<1:8> as the first to eighth internal data ID<1:8> after the start of the write operation of the ECS operation.

The first word line WL1 and the first column line YI1 that are included in the first bank BK1 of the first bank group 331 of the semiconductor device 20 are activated by the first bank group address BG<1>, the first bank address BK<1>, the first row address RA<1>, and the first column address COL<1>. The first bank BK1 of the first bank group 331 stores the first to eighth internal data ID<1:8> in the memory cell MC that is connected to the activated word line and the activated column line after the start of the write operation of the ECS operation.

The ECS control circuit 111 of the controller 10 generates the ECS read signal ECS_RD for performing the read operation of the ECS operation on the third bank group 333, the ECS write signal ECS_WT for performing the write operation of the ECS operation on the third bank group 333, and the first to twelfth ECS addresses ECS_ADD<1:12> that are sequentially counted in order to select the multiple memory cells after the start of the read operation of the ECS operation and the write operation of the ECS operation.

The operation control circuit 112 of the controller 10 generates the first to third commands CMD<1:3> and the first to twelfth addresses ADD<1:12> based on the ECS read signal ECS_RD, the ECS write signal ECS_WT, and the first to twelfth ECS addresses ECS_ADD<1:12> after the start of the ECS operation in synchronization with the clock signal CLK.

At time T16, the command decoder 310 of the semiconductor device 20 generates the read signal RD after decoding the first to third commands CMD<1:3>.

The address decoder 320 of the semiconductor device 20 generates the third bank group address BG<3>, the first bank address BK<1>, the first row address RA<1>, and the first column address COL<1> that are activated by decoding the first to twelfth addresses ADD<1:12>.

The first word line WL1 and the first column line YI1 that are included in the first bank BK1 of the third bank group 333 of the semiconductor device 20 are activated by the first bank group address BG<1>, the first bank address BK<1>, the first row address RA<1>, and the first column address COL<1>. The first bank BK1 of the third bank group 333 outputs the first to eighth internal data ID<1:8> and the first to third internal parities IP<1:3> stored in the memory cell MC connected to the first word line WL1 and the first column line YI1 that are activated after the start of the read operation of the ECS operation.

The data input and output circuit 340 of the semiconductor device 20 outputs the first to eighth internal data ID<1:8> as the first to eighth data DATA<1:8> and outputs the first to third internal parities IP<1:3> as the first to third parities PRT<1:3> after the start of the read operation of the ECS operation.

The data processing circuit 131 of the controller 10 generates the first to eighth transfer data TD<1:8> from the first to eighth data DATA<1:8> after the start of the read operation of the ECS operation. The data processing circuit 131 generates the first to third transfer parities TP<1:3> from the first to third parities PRT<1:3> after the start of the read operation of the ECS operation.

The error correction circuit 132 of the controller 10 generates the first to eighth correction data CD<1:8> by correcting one or more errors in the first to eighth transfer data TD<1:8> based on the first to eighth transfer data TD<1:8> and the first to third transfer parities TP<1:3> after the start of the read operation of the ECS operation. The error correction circuit 132 stores the first to eighth correction data CD<1:8> having one or more errors corrected after the start of the read operation of the ECS operation.

At time T17, the error correction circuit 132 of the controller 10 outputs the first to eighth correction data CD<1:8> having one or more errors corrected after the start of the write operation of the ECS operation.

The data processing circuit 131 of the controller 10 generates the first to eighth data DATA<1:8> from the first to eighth correction data CD<1:8> after the start of the write operation of the ECS operation.

The command decoder 310 of the semiconductor device 20 generates the write signal WT after decoding the first to third commands CMD<1:3>.

The address decoder 320 of the semiconductor device 20 generates the third bank group address BG<3>, the first bank address BK<1>, the first row address RA<1>, and the first column address COL<1> that are activated by decoding the first to twelfth addresses ADD<1:12>.

The data input and output circuit 340 of the semiconductor device 20 outputs the first to eighth data DATA<1:8> as the first to eighth internal data ID<1:8> after the start of the write operation of the ECS operation.

The first word line WL1 and the first column line YI1 that are included in the first bank BK1 of the third bank group 333 of the semiconductor device 20 are activated by the first bank group address BG<1>, the first bank address BK<1>, the first row address RA<1>, and the first column address COL<1>. The first bank BK1 of the first bank group 331 stores the first to eighth internal data ID<1:8> in the memory cell MC that is connected to the activated word line and the activated column line after the start of the write operation of the ECS operation.

Thereafter, the controller 10 and the semiconductor device 20 sequentially performs a read operation and write operation of an ECS operation on the third bank group 333 after performing the read operation and write operation of the ECS operation on the first bank group 331 identically with the operations from time T14 to time T17. Furthermore, when completing the read operations and write operations of the ECS operations for the first bank group 331 and the third bank group 333, the controller 10 and the semiconductor device 20 sequentially perform a read operation and write operation of an ECS operation on the second bank group 332 and the fourth bank group 334.

At time T18, the error correction circuit 132 of the controller 10 outputs the first to eighth correction data CD<1:8> having one or more errors corrected after the start of the write operation of the ECS operation.

The data processing circuit 131 of the controller 10 generates the first to eighth data DATA<1:8> from the first to eighth correction data CD<1:8> after the start of the write operation of the ECS operation.

The command decoder 310 of the semiconductor device 20 generates the write signal WT after decoding the first to third commands CMD<1:3>.

The address decoder 320 of the semiconductor device 20 generates the fourth bank group address BG<4>, the fourth bank address BK<4>, the sixteenth row address RA<16>, and the sixteenth column address COL<16> that are activated by decoding the first to twelfth addresses ADD<1:12>.

The data input and output circuit 340 of the semiconductor device 20 outputs the first to eighth data DATA<1:8> as the first to eighth internal data ID<1:8> after the start of the write operation of the ECS operation.

The sixteenth word line WL16 and the sixteenth column line YI16 that are included in the fourth bank BK4 of the fourth bank group 334 of the semiconductor device 20 are activated by the fourth bank group address BG<4>, the fourth bank address BK<4>, the sixteenth row address RA<16>, and the sixteenth column address COL<16>. The fourth bank BK4 of the fourth bank group 334 stores the first to eighth internal data ID<1:8> in a memory cell MC that is connected to the sixteenth word line WL16 and the sixteenth column line YI16 that are activated after the start of the write operation of the ECS operation. At time T18, the ECS operation for the multiple memory cells MC that are included in the first to fourth bank groups 331 to 334 is completed.

The controller 10 outputs the first to third commands CMD<1:3> for performing a precharge operation when the ECS operation is completed.

At time T19, the command decoder 310 of the semiconductor device 20 generates the precharge signal PCG after decoding the first to third commands CMD<1:3>.

The address decoder 320 of the semiconductor device 20 generates the first to fourth bank group addresses BG<1:4>, the first to fourth bank addresses BK<1:4>, the first to sixteenth row addresses RA<1:16>, and the first to sixteenth column addresses COL<1:16> that are sequentially counted by decoding the first to twelfth addresses ADD<1:12>.

The semiconductor device 20 performs the precharge operation on the first to fourth bank groups 331 to 334.

The semiconductor system 1 according to the above embodiment of the present disclosure may advantageously prevent the occurrence of an error of internal data stored in a memory cell MC by performing a precharge operation after completing ECS operations for all the memory cells of the first to fourth bank groups 331 to 334 that are included in the semiconductor device 20. The semiconductor system 1 may advantageously prevent the omission of an ECS operation for a memory cell MC by performing a precharge operation after completing ECS operations for all the memory cells of the first to fourth bank groups 331 to 334 that are included in the semiconductor device 20.

Figure 13:
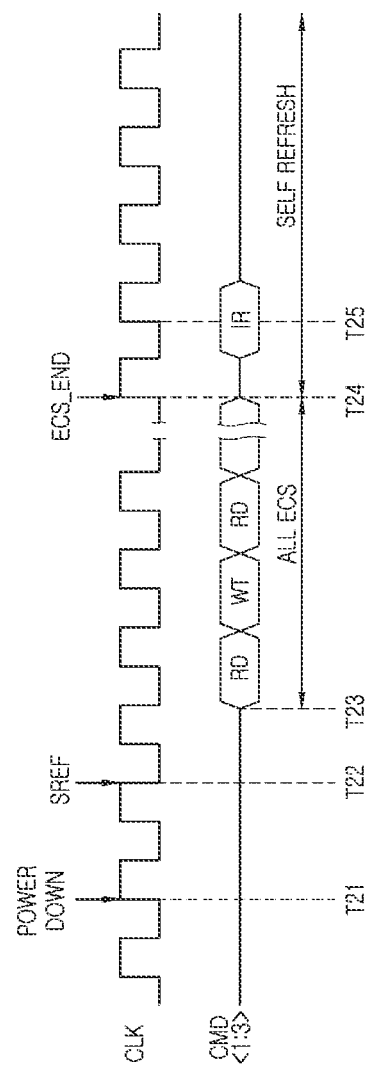
FIG. 13 is a timing diagram illustrating an ECS operation and self-refresh operation of the semiconductor system according to an embodiment of the present disclosure.

FIG. 13 is a timing diagram illustrating an ECS operation and self-refresh operation of the semiconductor system according to an embodiment of the present disclosure. The timing for ECS operation according to an embodiment of the present disclosure is shown, wherein an operation of sequentially performing ECS operations on multiple memory cells that are included in the first to fourth bank groups 331 to 334 may be described as follows with reference to FIG. 13.

At time T21, a power-down operation POWER DOWN is entered.

At time T22, the ECS control circuit 111 of the controller 10 generates the ECS read signal ECS_RD for performing a read operation of an ECS operation, the ECS write signal ECS_WT for performing a write operation of the ECS operation, and the first to twelfth ECS addresses ECS_ADD<1:12> that are sequentially counted in order to select multiple memory cells after the start of the read operation of the ECS operation and the write operation of the ECS operation, based on the self-refresh signal SREF that is generated after the start of the entry into the power-down operation.

ECS operations may be sequentially performed on multiple memory cells that are included in the first to fourth bank groups 331 to 334 of the semiconductor device 20 from time T23 to time T24.

Time T23 to time T24 may be selected as an ECS operation period ALL ECS during which the ECS operations are performed on all the memory cells.

At time T24, the ECS end signal ECS_END is generated after the end of the ECS operations for all the memory cells.

The ECS control circuit 111 of the controller 10 may advantageously avoid generating the ECS read signal ECS_RD, the ECS write signal ECS_WT, and the first to twelfth ECS addresses ECS_ADD<1:12> at a time at which the ECS end signal ECS_END is input.

The operation control circuit 112 of the controller 10 generates the first to third commands CMD<1:3> for performing a self-refresh operation after the end of the ECS operations and in synchronization with the clock signal CLK.

At time T25, the command decoder 310 of the semiconductor device 20 generates the internal refresh signal IR after decoding the first to third commands CMD<1:3> for performing the self-refresh operation.

The semiconductor device 20 performs the self-refresh operation by sequentially activating all the word lines (WL1 to WL16 in FIG. 10) of the first to fourth bank groups 331 to 334, based on the first to fourth bank group addresses BG<1:4>, the first to fourth bank addresses BK<1:4>, and the first to sixteenth row addresses RA<1:16> that are sequentially counted when the internal refresh signal IR is generated.

A time period after time T25 may be selected as a self-refresh operation period SELF REFRESH during which the self-refresh operation is performed on all the word lines (WL1 to WL16 in FIG. 10).

The semiconductor system 1 according to the above embodiment of the present disclosure may advantageously prevent the occurrence of an error of internal data stored in a memory cell MC by performing a self-refresh operation after completing ECS operations for all the memory cells of the first to fourth bank groups 331 to 334 that are included in the semiconductor device 20 after the start of entry into a power-down operation. The semiconductor system 1 may advantageously prevent the omission of an ECS operation for a memory cell MC by performing a self-refresh operation after completing ECS operations for all the memory cells of the first to fourth bank groups 331 to 334 that are included in the semiconductor device 20 after the start of entry into a power-down operation.

Figure 14:
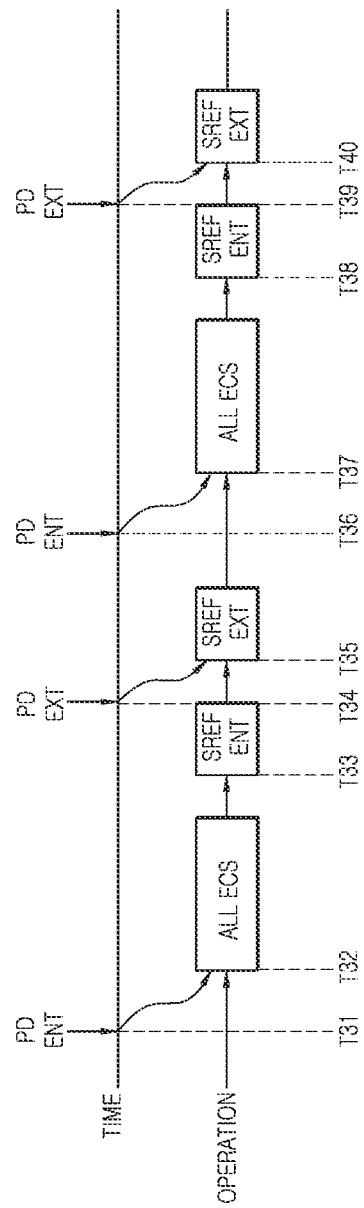
FIG. 14 is a timing diagram illustrating a power-down operation of the semiconductor system according to an embodiment of the present disclosure.

FIG. 14 is a timing diagram for describing a power-down operation of the semiconductor system according to an embodiment of the present disclosure. The power-down operation according to an embodiment of the present disclosure is described, wherein an operation of repeatedly performing a power-down operation may be described as follows with reference to FIG. 14.

At time T31, a power-down operation is entered (PD ENT).

From time T32 to timing T33, ECS operations are sequentially performed on multiple memory cells that are included in the first to fourth bank groups 331 to 334 of the semiconductor device 20. A time period from time T32 to time T33 may be selected as an ECS operation period ALL ECS during which the ECS operations are performed on all the memory cells.

From time T33 to timing T34, all the word lines (WL1 to WL16 in FIG. 10) that are included in the first to fourth bank groups 331 to 334 of the semiconductor device 20 are sequentially activated, and a self-refresh operation is performed.

At time T34, the power-down operation is terminated (PD EXT).

At time T35, after the self-refresh operation for all the word lines is performed, the self-refresh operation is terminated (SREF EXT).

At time T36, a power-down operation may be entered again (PD ENT).

From time T37 to time T38, ECS operations may be sequentially performed on the multiple memory cells that are included in the first to fourth bank groups 331 to 334 of the semiconductor device 20. A period from time T37 to time T38 may be selected as an ECS operation period ALL ECS during which the ECS operations are performed on all the memory cells.

From time T38 to time T39, all the word lines (WL1 to WL16 in FIG. 10) that are included in the first to fourth bank groups 331 to 334 of the semiconductor device 20 may be sequentially activated, and a self-refresh operation may be performed.

At time T39, the power-down operation may be terminated (PD EXT).

At time T40, after the self-refresh operation for all the word lines is performed, the self-refresh operation is terminated (SREF EXT).

The semiconductor system 1 according to the above embodiment of the present disclosure may advantageously prevent the occurrence of an error of internal data stored in a memory cell MC by performing a self-refresh operation after completing ECS operations for all the memory cells of the first to fourth bank groups 331 to 334 that are included in the semiconductor device 20 after the start of entry into a power-down operation. The semiconductor system 1 may advantageously prevent the omission of an ECS operation for a memory cell MC by performing a self-refresh operation after completing ECS operations for all the memory cells of the first to fourth bank groups 331 to 334 that are included in the semiconductor device 20 after the start of entry into a power-down operation.

Figure 15:
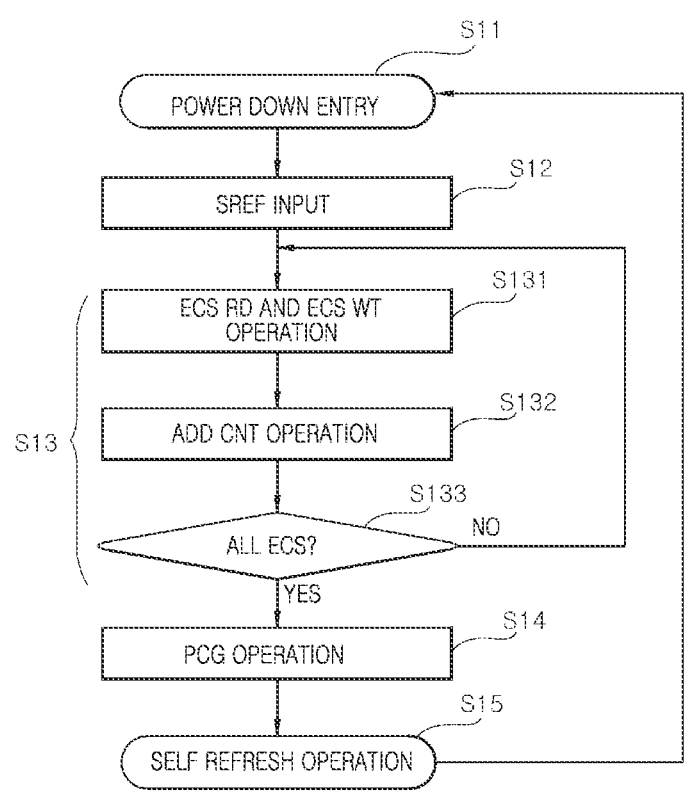
FIG. 15 and FIG. 16 are flowcharts illustrating an error check scrub method of the semiconductor system according to an embodiment of the present disclosure.

FIG. 15 is a flowchart illustrating an error check scrub (ECS) method of the semiconductor system according to an embodiment of the present disclosure. The ECS method is described, wherein an operation of sequentially performing ECS operations on multiple memory cells is described as follows with reference to FIG. 15.

The ECS method includes power-down entry S11, self-refresh signal input S12, ECS operation S13, precharge operation S14, and self-refresh operation S15.

The power-down entry includes entering S11 a power-down operation POWER DOWN. When the power-down operation POWER DOWN is entered, the self-refresh signal SREF is generated, for example, at a logic high level.

The self-refresh signal input includes inputting S12 the self-refresh signal SREF at a logic high level. When the self-refresh signal SREF is input at a logic high level, the ECS control circuit 111 may generate the ECS read signal ECS_RD for performing a read operation of an ECS operation, the ECS write signal ECS_WT for performing a write operation of the ECS operation, and the first to twelfth ECS addresses ECS_ADD<1:12> that are sequentially counted in order to select multiple memory cells after the start of the read operation of the ECS operation and the write operation of the ECS operation.

The ECS operation S13 includes sequentially performing the read operation of the ECS operation and the write operation of the ECS operation on all the memory cells that are included in the memory circuit 330. The ECS operation S13 includes performing S131 an ECS read operation and an ECS write operation of an ECS operation, performing S132 an address counting operation, and detecting S133 when an ECS operation period ends.

The read operation and write operation S131 may include sequentially performing the read operation and write operation of the ECS operation.

During the read operation and write operation S131 of the ECS operation S13, the operation control circuit 112 of the controller 10 may generate the first to third commands CMD<1:3> and the first to twelfth addresses ADD<1:12>, based on the ECS read signal ECS_RD, the ECS write signal ECS_WT, and the first to twelfth ECS addresses ECS_ADD<1:12> in synchronization with the clock signal CLK.

During the read operation and write operation S131 of the ECS operation S13, the command decoder 310 of the semiconductor device 20 may generate the write signal WT after generating the read signal RD in response to decoding the first to third commands CMD<1:3>. The address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> that are sequentially activated by decoding the first to twelfth addresses ADD<1:12>. The memory circuit 330 of the semiconductor device 20 may output the first to eighth internal data ID<1:8> and the first to third internal parities IP<1:3> as the first bank group 331 to the fourth bank group 334 are sequentially activated. The data input and output circuit 340 of the semiconductor device 20 may output the first to eighth internal data ID<1:8> as the first to eighth data DATA<1:8> and output the first to third internal parities IP<1:3> as the first to third parities PRT<1:3> after the start of the read operation of the ECS operation S13.

The data processing circuit 131 of the controller 10 may generate the first to eighth transfer data TD<1:8> from the first to eighth data DATA<1:8> after the start of the read operation of the ECS operation S13. The data processing circuit 131 of the controller 10 may generate the first to third transfer parities TP<1:3> from the first to third parities PRT<1:3> after the start of the read operation of the ECS operation S13. The error correction circuit 132 of the controller 10 may generate the first to eighth correction data CD<1:8> by correcting at least one error in the first to eighth transfer data TD<1:8>, based on the first to eighth transfer data TD<1:8> and the first to third transfer parities TP<1:3> after the start of the read operation of the ECS operation S13. The error correction circuit 132 may store the first to eighth correction data CD<1:8> having one or more errors corrected. The error correction circuit 132 may output the first to eighth correction data CD<1:8> having one or more errors corrected after the start of the write operation of the ECS operation S13. The data processing circuit 131 may generate the first to eighth data DATA<1:8> from the first to eighth correction data CD<1:8> after the start of the write operation of the ECS operation S13 and may output the first to eighth data DATA<1:8> to the semiconductor device 20.

The data input and output circuit 340 of the semiconductor device 20 may output the first to eighth data DATA<1:8> as the first to eighth internal data ID<1:8> after the start of the write operation of the ECS operation S13. The memory circuit 330 of the semiconductor device 20 may store the first to eighth internal data ID<1:8> as the first bank group 331 to the fourth bank group 334 are sequentially activated. The first to eighth internal data ID<1:8> having one or more errors corrected may optionally and advantageously be stored at the same memory cell locations, among the multiple memory cells that are included in the memory circuit 330, where the internal data (ID<1:8> was stored prior to being corrected.

The address counting operation S132 includes up-counting the first to fourth bank group addresses BG<1:4>, the first to fourth bank addresses BK<1:4>, the first to sixteenth row addresses RA<1:16>, and the first to sixteenth column addresses COL<1:16> once. During the address counting operation S132, the address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> by decoding the first to twelfth addresses ADD<1:12> and up-counting once the first to fourth bank group addresses BG<1:4>, the first to fourth bank addresses BK<1:4>, the first to sixteenth row addresses RA<1:16>, and the first to sixteenth column addresses COL<1:16>.

The ECS operation period detection includes detecting S133 whether the ECS operations have been performed on all the memory cells. During the detecting S133, when all of the first to twelfth addresses ADD<1:12> at a logic high level are counted and generated and the ECS operations are performed on all the memory cells (YES), the precharge operation S14 is performed. During the ECS operation period detecting S133, when all of the first to twelfth addresses ADD<1:12> are not counted and generated at a logic high level, in other words, the ECS operations for all the memory cells are not completed (NO), the process continues with the read operation and write operation S131 of the ECS operation S13.

The precharge operation includes performing a precharge operation S14 on all bank groups that are included in the memory circuit 330, for example, by applying the precharge signal PCG to the memory cells for which a precharge operation is to be performed. The precharge signal may be applied to one bank group at a time and may be applied at a time slightly before the time at which the bank group is accessed. During the precharge operation S14, the operation control circuit 112 of the controller 10 may generate the first to third commands CMD<1:3> having a logic level combination for performing the precharge operation when all of the first to twelfth addresses ADD<1:12> are counted and generated at a logic high level.

The command decoder 310 of the semiconductor device 20 may generate the precharge signal PCG after decoding the first to third commands CMD<1:3>. The memory circuit 330 of the semiconductor device 20 may perform the precharge operation on the first to fourth bank groups 331 to 334.

The self-refresh operation includes performing a self-refresh operation S15 including sequentially activating all word lines that are included in the memory circuit 330. During the self-refresh operation S15, the operation control circuit 112 of the controller 10 may generate the first to third commands CMD<1:3> for performing the self-refresh operation after the precharge operation S14 is performed.

The command decoder 310 of the semiconductor device 20 may generate the internal refresh signal IR after decoding the first to third commands CMD<1:3>. The address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> that are sequentially activated. The memory circuit 330 of the semiconductor device 20 may perform the self-refresh operation S15 including sequentially activating multiple word lines as the first bank group 331 to the fourth bank group 334 are sequentially activated. When the self-refresh operation S15 is completed or terminated, the process continues with power-down entry S11.

The ECS method according to the above embodiment of the present disclosure may advantageously prevent the occurrence of an error of internal data stored in a memory cell MC by performing a self-refresh operation after completing an ECS operation on all the memory cells of the first to fourth bank groups 331 to 334 that are included in the semiconductor device 20 after the start of entry into a power-down operation. The ECS method may advantageously prevent the omission of an ECS operation for a memory cell MC by performing a self-refresh operation after completing an ECS operation for all the memory cells of the first to fourth bank groups 331 to 334 that are included in the semiconductor device 20 after the start of entry into a power-down operation.

Figure 16:
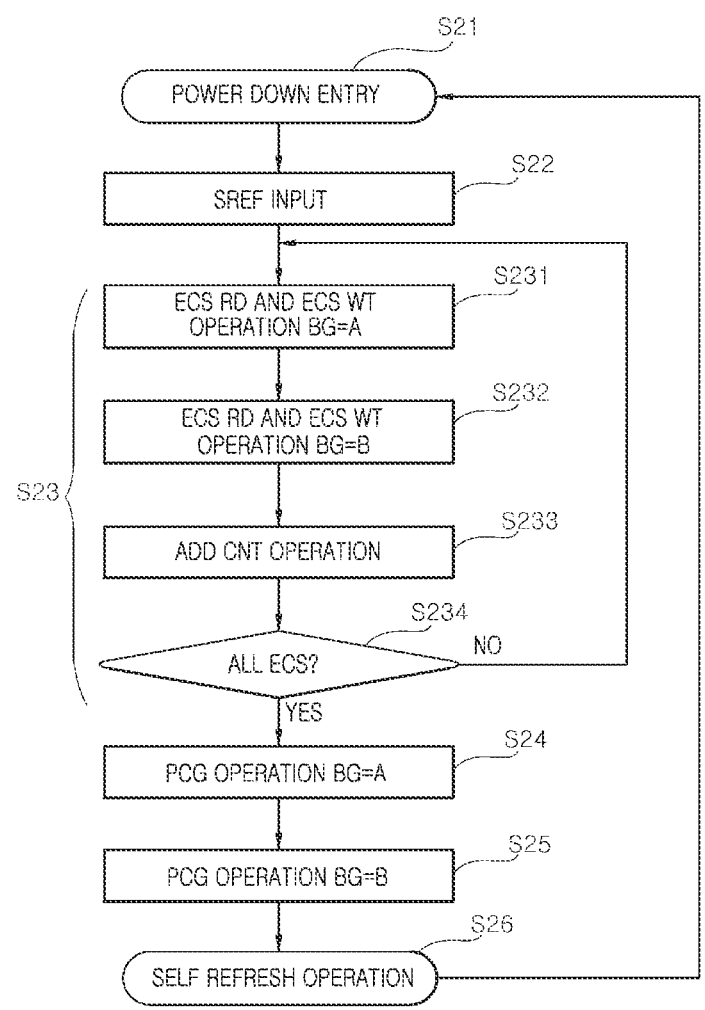

FIG. 16 is a flowchart illustrating an ECS method of the semiconductor system according to an embodiment of the present disclosure. The ECS method is described, wherein an operation of alternately performing an ECS operation on different bank groups (also referred to as bank group interleaving) may be described as follows with reference to FIG. 16.

The ECS method may include power-down entry S21, self-refresh signal input S22, ECS operation S23, a first precharge operation S24, a second precharge operation S25, and a self-refresh operation S26.

The power-down entry includes entering S11 a power-down operation POWER DOWN. When the power-down operation POWER DOWN is entered, the self-refresh signal SREF is generated, for example, at a logic high level.

The self-refresh signal input includes inputting S22 the self-refresh signal SREF at a logic high level. When the self-refresh signal SREF is input S22 at a logic high level, the ECS control circuit 111 may generate the ECS read signal ECS_RD for performing a read operation of an ECS operation, the ECS write signal ECS_WT for performing a write operation of the ECS operation, and the first to twelfth ECS addresses ECS_ADD<1:12> that are sequentially counted in order to select multiple memory cells after the start of the read operation of the ECS operation and the write operation of the ECS operation.

The ECS operation S23 includes alternately performing (also known as bank group interleaving) the read operation of the ECS operation and the write operation of the ECS operation on multiple bank groups that are included in the memory circuit 330. The ECS operation S23 includes performing a first read operation and first write operation S231 for a first bank group (BG=A), a second read operation and second write operation S232 for a second bank group (BG=B), an address counting operation S233, and detecting S234 when an ECS operation period ends.

The first read operation and first write operation S231 of the ECS operation S23 include sequentially performing a read operation and write operation of the ECS operation S23 on a first bank group (BG=A). The first bank group (BG=A) is selected as the first bank group 331 in this example but may be alternatively selected as the second bank group 332 according to another embodiment.

During the first read operation and first write operation S231 of the ECS operation S23, the operation control circuit 112 of the controller 10 may generate the first to third commands CMD<1:3> and the first to twelfth addresses ADD<1:12> based on the ECS read signal ECS_RD, the ECS write signal ECS_WT, and the first to twelfth ECS addresses ECS_ADD<1:12> in synchronization with the clock signal CLK.

During the first read operation and first write operation S21 of the ECS operation S23, the command decoder 310 of the semiconductor device 20 may generate the write signal WT after generating the read signal RD in response to decoding the first to third commands CMD<1:3>. The address decoder 320 of the semiconductor device 20 may generate the first bank group address BG<1>, and the first to fourth bank addresses BK<1:4>, the first to sixteenth row addresses RA<1:16>, and the first to sixteenth column addresses COL<1:16> that are sequentially activated by decoding the first to twelfth addresses ADD<1:12>. The memory circuit 330 of the semiconductor device 20 may output the first to eighth internal data ID<1:8> and the first to third internal parities IP<1:3> as the first bank group 331 is activated. The data input and output circuit 340 of the semiconductor device 20 may output the first to eighth internal data ID<1:8> as the first to eighth data DATA<1:8> and output the first to third internal parities IP<1:3> as the first to third parities PRT<1:3> after the start of the read operation of the ECS operation S23.

The data processing circuit 131 of the controller 10 may generate the first to eighth transfer data TD<1:8> from the first to eighth data DATA<1:8> after the start of a read operation of the ECS operation S23. The data processing circuit 131 of the controller 10 may generate the first to third transfer parities TP<1:3> from the first to third parities PRT<1:3> after the start of the read operation of the ECS operation S23. The error correction circuit 132 of the controller 10 may generate the first to eighth correction data CD<1:8> by correcting at least one error in the first to eighth transfer data TD<1:8>, based on the first to eighth transfer data TD<1:8> and the first to third transfer parities TP<1:3> after the start of the read operation of the ECS operation S23. The error correction circuit 132 may store the first to eighth correction data CD<1:8> having one or more errors corrected. The error correction circuit 132 may output the first to eighth correction data CD<1:8> having one or more errors corrected after the start of a write operation of the ECS operation S23. The data processing circuit 131 may generate the first to eighth data DATA<1:8> from the first to eighth correction data CD<1:8> after the start of the write operation of the ECS operation S23 and may output the first to eighth data DATA<1:8> to the semiconductor device 20.

The data input and output circuit 340 of the semiconductor device 20 may output the first to eighth data DATA<1:8> as the first to eighth internal data ID<1:8> after the start of the write operation of the ECS operation S23. The memory circuit 330 of the semiconductor device 20 may store the first to eighth internal data ID<1:8> as the first bank group 331 is activated. The first to eighth internal data ID<1:8> having one or more errors corrected may optionally and advantageously be stored at the same memory cell locations, among the multiple memory cells that are included in the first bank group 331, where the internal data (ID<1:8> was stored prior to being corrected.

The second read operation and second write operation S232 of the ECS operation S23 include sequentially performing the read operation and write operation of the ECS operation S23 on a second bank group (BG=B). The second bank group (BG=B) is selected as the third bank group 333 in this example but may be alternatively selected as the fourth bank group 334 according to another embodiment.

During the second read operation and second write operation S232 of the ECS operation S23, the operation control circuit 112 of the controller 10 may generate the first to third commands CMD<1:3> and the first to twelfth addresses ADD<1:12>, based on the ECS read signal ECS_RD, the ECS write signal ECS_WT, and the first to twelfth ECS addresses ECS_ADD<1:12> in synchronization with the clock signal CLK.

During the second read operation and second write operation of the ECS operation S23, the command decoder 310 of the semiconductor device 20 may generate the write signal WT after generating the read signal RD in response to decoding the first to third commands CMD<1:3>. The address decoder 320 of the semiconductor device 20 may generate the third bank group address BG<3>, and the first to fourth bank addresses BK<1:4>, the first to sixteenth row addresses RA<1:16>, and the first to sixteenth column addresses COL<1:16> that are sequentially activated by decoding the first to twelfth addresses ADD<1:12>. The memory circuit 330 of the semiconductor device 20 may output the first to eighth internal data ID<1:8> and the first to third internal parities IP<1:3> as the third bank group 333 is activated. The data input and output circuit 340 of the semiconductor device 20 may output the first to eighth internal data ID<1:8> as the first to eighth data DATA<1:8> and output the first to third internal parities IP<1:3> as the first to third parities PRT<1:3> after the start of the read operation of the ECS operation S23.

The data processing circuit 131 of the controller 10 may generate the first to eighth transfer data TD<1:8> from the first to eighth data DATA<1:8> after the start of the read operation of the ECS operation S23. The data processing circuit 131 of the controller 10 may generate the first to third transfer parities TP<1:3> from the first to third parities PRT<1:3> after the start of the read operation of the ECS operation S23. The error correction circuit 132 of the controller 10 may generate the first to eighth correction data CD<1:8> by correcting at least one error in the first to eighth transfer data TD<1:8>, based on the first to eighth transfer data TD<1:8> and the first to third transfer parities TP<1:3> after the start of the read operation of the ECS operation S23. The error correction circuit 132 may store the first to eighth correction data CD<1:8> having one or more errors corrected. The error correction circuit 132 may output the first to eighth correction data CD<1:8> having one or more errors corrected after the start of the write operation of the ECS operation S23. The data processing circuit 131 may generate the first to eighth data DATA<1:8> from the first to eighth correction data CD<1:8> after the start of the write operation of the ECS operation S23 and may output the first to eighth data DATA<1:8> to the semiconductor device 20.

The data input and output circuit 340 of the semiconductor device 20 may output the first to eighth data DATA<1:8> as the first to eighth internal data ID<1:8> after the start of the write operation of the ECS operation S23. The memory circuit 330 of the semiconductor device 20 may store the first to eighth internal data ID<1:8> as the third bank group 333 is activated. The first to eighth internal data ID<1:8> having one or more errors corrected may optionally and advantageously be stored at the same memory cell locations, among multiple memory cells included in the third bank group 333, where the internal data (ID<1:8> was stored prior to being corrected.

After the ECS operation is alternately performed (i.e., bank group interleaving) on the first bank group 331 and the third bank group 333, an ECS operation may be alternately performed (i.e., bank group interleaving) on the second bank group 332 and the fourth bank group 334.

The address counting operation S233 includes up-counting the first to fourth bank group addresses BG<1:4>, the first to fourth bank addresses BK<1:4>, the first to sixteenth row addresses RA<1:16>, and the first to sixteenth column addresses COL<1:16> once. During the address counting operation S233, the address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> by decoding the first to twelfth addresses ADD<1:12> and up-counting once the first to fourth bank group addresses BG<1:4>, the first to fourth bank addresses BK<1:4>, the first to sixteenth row addresses RA<1:16>, and the first to sixteenth column addresses COL<1:16>.

The ECS operation period detection includes detecting S234 whether the ECS operations have been performed on all the memory cells. During the detecting S234, when all of the first to twelfth addresses ADD<1:12> at a logic high level are counted and generated and the ECS operation are performed on all the memory cells (YES), the first precharge operation S24 is performed. During the ECS operation period detecting S234, when the first to twelfth addresses ADD<1:12> are not counted and generated at a logic high level, in other words, the ECS operation for all the memory cells is not completed (NO), the process continues with the first read operation and first write operation of the ECS operation S23.

The first precharge operation includes performing a precharge operation S24 on the first bank group 331 (BG=A). During the first precharge operation S24, the operation control circuit 112 of the controller 10 may generate the first to third commands CMD<1:3> having a logic level combination for performing the precharge operation when all of the first to twelfth addresses ADD<1:12> are counted and generated at a logic high level and the ECS operations are performed on all the memory cells (YES).

The command decoder 310 of the semiconductor device 20 may generate the precharge signal PCG after decoding the first to third commands CMD<1:3>. The memory circuit 330 of the semiconductor device 20 may perform the first precharge operation S24 on the first bank group 331.

The second precharge operation includes performing the precharge operation S25 on the third bank group 333 (BG=B). During the second precharge operation S25, the operation control circuit 112 of the controller 10 may generate the first to third commands CMD<1:3> having a logic level combination for performing the precharge operation when the first precharge operation S24 is completed or terminated.

The command decoder 310 of the semiconductor device 20 may generate the precharge signal PCG after decoding the first to third commands CMD<1:3>. The memory circuit 330 of the semiconductor device 20 may perform the second precharge operation S25 on the third bank group 333.

After the precharge operation is alternately performed (i.e., bank group interleaving) on the first bank group 331 and the third bank group 333, a precharge operation may be alternately performed (i.e., bank group interleaving) on the second bank group 332 and the fourth bank group 334.

The self-refresh operation includes performing a self-refresh operation S26 including sequentially activating all the word lines that are included in the memory circuit 330. During the self-refresh operation S26, the operation control circuit 112 of the controller 10 may generate the first to third commands CMD<1:3> for performing the self-refresh operation after the second precharge operation S25 is performed.

The command decoder 310 of the semiconductor device 20 may generate the internal refresh signal IR after decoding the first to third commands CMD<1:3>. The address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> that are sequentially activated. The memory circuit 330 of the semiconductor device 20 may perform the self-refresh operation S26 including sequentially activating multiple word lines as the first bank group 331 to the fourth bank group 334 are sequentially activated. When the self-refresh operation S26 is completed or terminated, the process continues with power-down entry S21.

The ECS method according to the above embodiment of the present disclosure may advantageously prevent the occurrence of an error of internal data stored in a memory cell MC by performing a self-refresh operation after completing an ECS operation on all the memory cells of the first to fourth bank groups 331 to 334 that are included in the semiconductor device 20 after the start of entry into a power-down operation. The ECS method may advantageously prevent the omission of an ECS operation for a memory cell MC by performing a self-refresh operation after completing an ECS operation on all the memory cells of the first to fourth bank groups 331 to 334 that are included in the semiconductor device 20 after the start of entry into a power-down operation.

Figure 17:
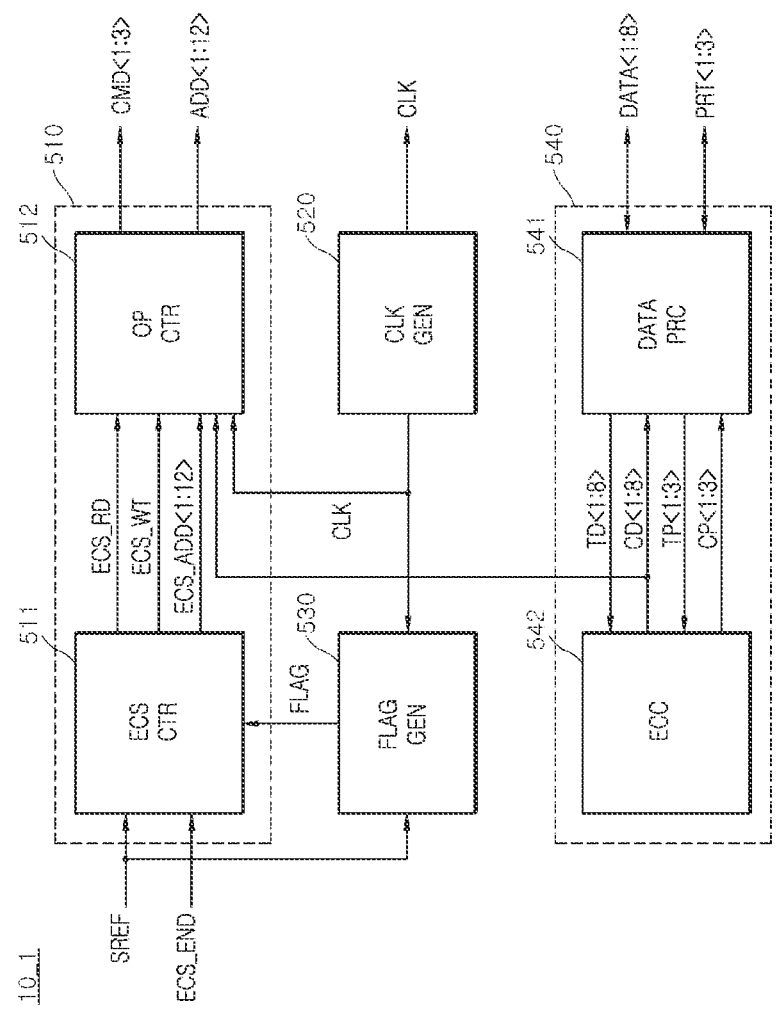
FIG. 17 is a block diagram illustrating another embodiment of the controller included in the semiconductor system illustrated in FIG. 1.

FIG. 17 is a block diagram illustrating another embodiment of the controller 10 included in the semiconductor system 1. The controller 10_1 may include a command control circuit 510, a clock generation circuit (CLK GEN) 520, a flag generation circuit (FLAG GEN) 530, and a data control circuit 540.

The command control circuit 510 may include an ECS control circuit (ECS CTR) 511 and an operation control circuit (OP CTR) 512.

The ECS control circuit 511 generates an ECS read signal ECS_RD, an ECS write signal ECS_WT, and first to twelfth ECS addresses ECS_ADD<1:12>, based on a flag signal FLAG, a self-refresh signal SREF that is generated after the start of entry into a power-down operation, and an ECS end signal ECS_END that is generated after the end of an ECS operation. The ECS control circuit 511 generates the ECS read signal ECS_RD for performing a read operation of an ECS operation, the ECS write signal ECS_WT for performing a write operation of the ECS operation, and the first to twelfth ECS addresses ECS_ADD<1:12> that are sequentially counted in order to select multiple memory cells after the start of the read operation of the ECS operation and the write operation of the ECS operation, from the time at which the self-refresh signal SREF is input to the time at which the ECS end signal ECS_END is input when the flag signal FLAG is not generated. The ECS control circuit 511 blocks the generation of the ECS read signal ECS_RD, the ECS write signal ECS_WT, and the first to twelfth ECS addresses ECS_ADD<1:12> when the flag signal FLAG is generated. For example, the flag signal FLAG may be at a logic high level when the flag signal FLAG is considered to be generated, active, or set and may be at a logic low level when the flag signal FLAG is considered not to be generated, inactive, or set. In an alternative embodiment, the flag signal FLAG may be at a logic low level when the flag signal FLAG is considered to be generated, active, or set and may be at a logic high level when the flag signal FLAG is considered not to be generated, inactive, or set. The ECS control circuit 511 may merely block the generation of the ECS read signal ECS_RD, the ECS write signal ECS_WT, and the first to twelfth ECS addresses ECS_ADD<1:12> when the flag signal FLAG is generated, and may perform the same operation as the ECS control circuit 111 as illustrated and described with respect to FIG. 3.

The operation control circuit 512 generates first to third commands CMD<1:3> and first to twelfth addresses ADD<1:12>, based on the ECS read signal ECS_RD, the ECS write signal ECS_WT, and the first to twelfth ECS addresses ECS_ADD<1:12> after the start of an ECS operation and in synchronization with the clock signal CLK.

The operation control circuit 512 generates the first to third commands CMD<1:3> having a logic level combination for performing a read operation of an ECS operation and the first to twelfth addresses ADD<1:12> that are sequentially counted, after the start of the read operation and in synchronization with the clock signal CLK. The operation control circuit 512 generates the first to third commands CMD<1:3> having a logic level combination for performing a write operation of the ECS operation and the first to twelfth addresses ADD<1:12> having the same logic level combination as the addresses ADD<1:12> generated in the read operation of the ECS operation after the start of the write operation and in synchronization with the clock signal CLK. When the ECS operation is terminated in synchronization with the clock signal CLK, the operation control circuit 512 generates the first to third commands CMD<1:3> having a logic level combination for performing a precharge operation. The operation control circuit 512 may generate the first to third commands CMD<1:3> having a logic level combination for performing a self-refresh operation after the end of the ECS operation in synchronization with the clock signal CLK.

According to an embodiment, the operation control circuit 512 may be implemented to include a common queue circuit and a scheduler. The operation control circuit 512 sequentially stores first to eighth correction data CD<1:8> having one or more errors corrected and the first to twelfth ECS addresses ECS_ADD<1:12> after the start of a read operation of an ECS operation in synchronization with the clock signal CLK. The operation control circuit 512 sequentially outputs the first to eighth correction data CD<1:8> stored after the start of a write operation of the ECS operation in synchronization with the clock signal CLK. The operation control circuit 512 may output the first to twelfth ECS addresses ECS_ADD<1:12> stored after the start of the write operation of the ECS operation as the first to twelfth addresses ADD<1:12> in synchronization with the clock signal CLK. The queue circuit and the scheduler may be provided in a common controller and may be implemented to determine the sequence of a read operation and a write operation and to output a command and an address for performing the read operation and the write operation according to the operation sequence of the read operation and the write operation.

The operation control circuit 512 may be implemented with the same circuit as the operation control circuit 112 illustrated in FIG. 5 and may perform the same operation as the operation control circuit 112, as described above.

The clock generation circuit 520 generates the clock signal CLK that is periodically toggled or varied between different states or levels and may, for example, be a square wave or a sine wave. The clock generation circuit 520 may be implemented as a ring oscillator and may generate the clock signal CLK that varies or oscillates at a single frequency or varied frequencies. The clock signal CLK is generally utilized to synchronize timing of operations within the semiconductor system 1, for example, counting and addressing operations.

The flag generation circuit 530 generates the flag signal FLAG at a logic high level for a set period of time from timing at which the self-refresh signal SREF is input after the start of entry into a power-down operation after an ECS operation is performed on all of multiple memory cells. The flag generation circuit 530 may generate the flag signal FLAG at a logic low level after the set period of time. The set period of time, according to an embodiment of the present disclosure, may be determined as the time equal to or greater than the time for which a self-refresh operation is performed twice. According to an embodiment, the set period of time may be determined as a time period during which a self-refresh operation is repeatedly performed in various ways, for example, three times, four times, or five times.

The data control circuit 540 may include a data processing circuit (DATA PRC) 541 and an error correction circuit (ECC) 542.

The data processing circuit 541 generates first to eighth transfer data TD<1:8> from first to eighth data DATA<1:8> after the start of a read operation of an ECS operation. The data processing circuit 541 generates first to third transfer parities TP<1:3> from first to third parities PRT<1:3> after the start of the read operation of the ECS operation. The data processing circuit 541 generates the first to eighth data DATA<1:8> from the first to eighth correction data CD<1:8> after the start of a write operation of the ECS operation. The data processing circuit 541 generates the first to third parities PRT<1:3> from first to third correction parities CP<1:3> after the start of a write operation of a normal operation.

The error correction circuit 542 generates the first to eighth correction data CD<1:8> by correcting at least one error in the first to eighth transfer data TD<1:8>, based on the first to eighth transfer data TD<1:8> and the first to third transfer parities TP<1:3> after the start of a read operation of an ECS operation. The error correction circuit 542 stores the first to eighth correction data CD<1:8> having one or more errors corrected after the start of the read operation of the ECS operation. The error correction circuit 542 outputs the first to eighth correction data CD<1:8> having one or more errors corrected after the start of a write operation of the ECS operation.

The error correction circuit 542 may be implemented with the same circuit as the error correction circuit 132 illustrated in FIG. 6 and may perform the same operation as the error correction circuit 132, as described above.

Figure 18:
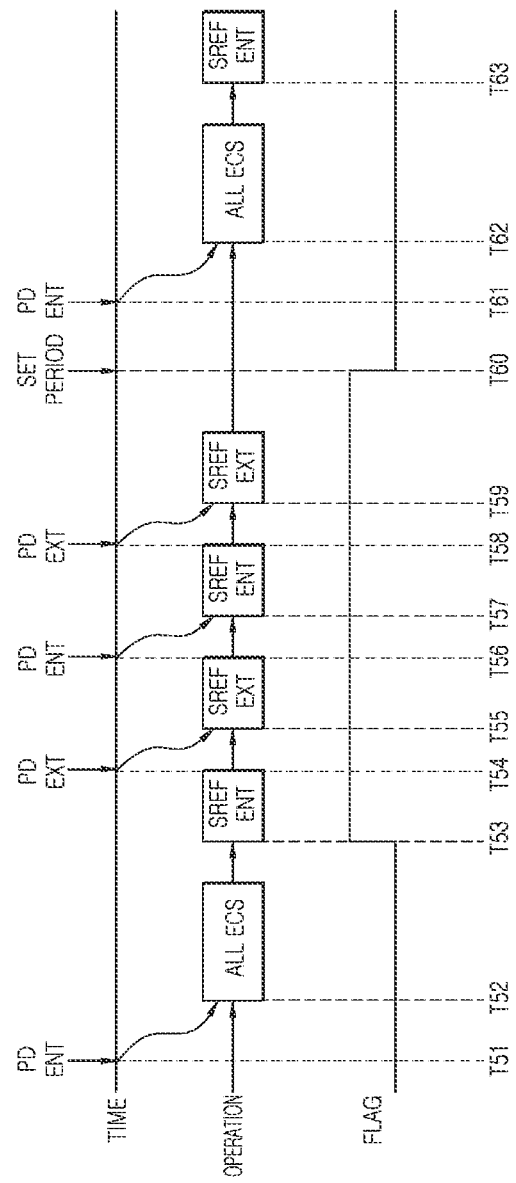
FIG. 18 is a timing diagram illustrating an ECS operation and self-refresh operation of the semiconductor system according to another embodiment of the present disclosure.

FIG. 18 is a timing diagram illustrating a power-down operation of the semiconductor system according to another embodiment of the present disclosure. The timing of the power-down operation according to another embodiment of the present disclosure is shown, wherein an operation of performing a self-refresh operation twice after performing all ECS operations on multiple memory cells is described as follows with reference to FIG. 18.

At time T51, a power-down operation is entered (PD ENT).

From time T52 to time T53, ECS operations are sequentially performed on multiple memory cells that are included in the first to fourth bank groups 331 to 334 of the semiconductor device 20. Time T52 to Time T53 may be selected as an ECS operation period ALL ECS in which the ECS operations are performed on all the memory cells.

At time T53, the flag generation circuit 530 may generate the flag signal FLAG at a logic high level for a set period from a time at which the self-refresh signal SREF is input after all the ECS operations are performed on the multiple memory cells.

From time T53 to time T54, a self-refresh operation is performed by sequentially activating all the word lines (WL1 to WL16 in FIG. 10) that are included in the first to fourth bank groups 331 to 334 of a semiconductor device 20_1.

At time T54, the power-down operation is completed or terminated (PD EXT).

At time T55, after the self-refresh operation is performed on all the word lines, the self-refresh operation is terminated (SREF EXT).

At time T56, a power-down operation (PD ENT) is entered again.

From time T57 to time T58, a self-refresh operation is performed by sequentially activating all the word lines (WL1 to WL16 in FIG. 10) that are included in the first to fourth bank groups 331 to 334 of the semiconductor device 20_1.

At time T58, the power-down operation is completed or terminated (PD EXT).

At time T59, after the self-refresh operation is performed on all the word lines, the self-refresh operation is completed or terminated (SREF EXT).

At time T60, the flag generation circuit 530 generates the flag signal FLAG at a logic low level after a set period (SET PERIOD) expires, for example, the set period may occur from time T53 to time T60. The set period may include a predetermined quantity of instances of performing the self-refresh operation, i.e., multiple times.

At time T61, a power-down operation is entered (PD ENT).

From time T62 to time T63, ECS operations may be sequentially performed on the multiple memory cells that are included in the first to fourth bank groups 331 to 334 of the semiconductor device 20_1. Time T62 to time T63 is selected as an ECS operation period ALL ECS during which the ECS operations are performed on all the memory cells.

The semiconductor system 1 according to the above embodiment of the present disclosure may advantageously prevent the occurrence of an error of internal data stored in a memory cell MC by performing a self-refresh operation after completing ECS operations on all the memory cells of the first to fourth bank groups 331 to 334 that are included in the semiconductor device 20 after the start of entry into a power-down operation. The semiconductor system 1 may advantageously prevent the omission of an ECS operation for a memory cell MC by performing a self-refresh operation after completing ECS operations for all the memory cells of the first to fourth bank groups 331 to 334 that are included in the semiconductor device 20 after the start of entry into a power-down operation.

Figure 19:
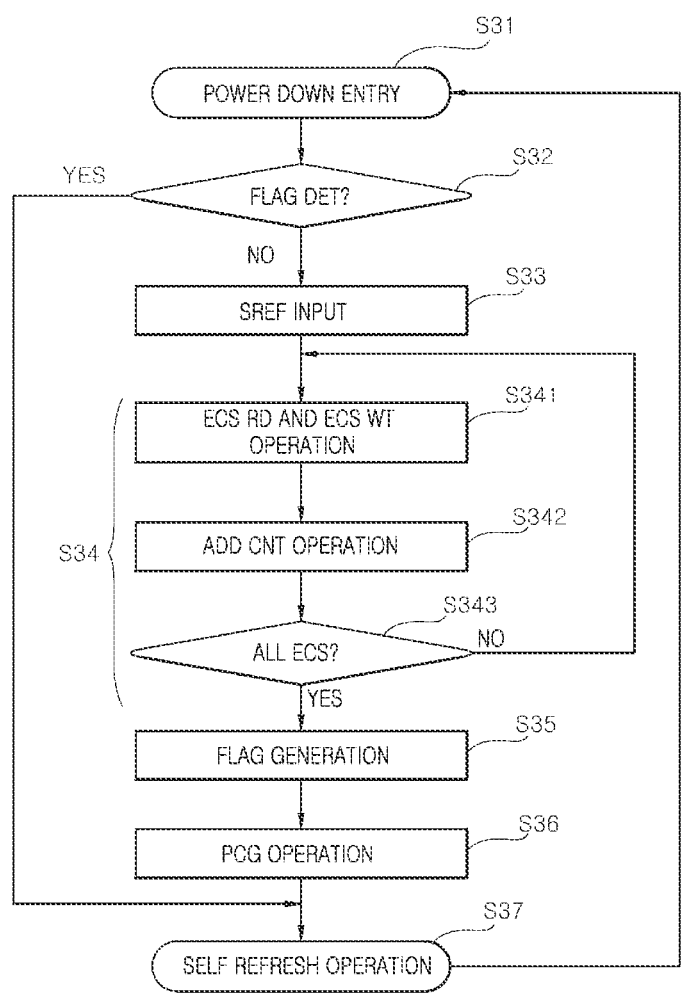
FIG. 19 is a flowchart illustrating an error check scrub method of the semiconductor system according to another embodiment of the present disclosure.

FIG. 19 is a flowchart illustrating an ECS method of the semiconductor system according to another embodiment of the present disclosure. The ECS method is described, wherein an operation of selectively performing an ECS operation and a self-refresh operation by detecting the logic level of the flag signal is described as follows with reference to FIG. 19.

The ECS method includes power-down entry S31, flag signal detection S32, self-refresh signal input S33, ECS operation S34, flag signal generation S35, precharge operation S36, and self-refresh operation S37.

The power-down entry includes entering S31 a power-down operation POWER DOWN. When the power-down operation POWER DOWN is entered, the self-refresh signal SREF is generated, for example, at a logic high level.

The flag signal detection S32 includes detecting the logic level of the flag signal FLAG. During the flag signal detection S32, when the flag signal FLAG has a logic low level (NO), the process continues with input of the self-refresh signal S33. During the flag signal detection S32, when the flag signal FLAG is detected at a logic high level (YES), the process continues with the self-refresh operation S37.

The self-refresh signal input includes inputting S33 the self-refresh signal SREF at a logic high level. The ECS control circuit 111 may generate the ECS read signal ECS_RD for performing a read operation of an ECS operation, the ECS write signal ECS_WT for performing a write operation of the ECS operation, and the first to twelfth ECS addresses ECS_ADD<1:12> that are sequentially counted in order to select multiple memory cells after the start of the read operation of the ECS operation and the write operation of the ECS operation, when the flag signal FLAG is generated at a logic low level and the self-refresh signal SREF is input S33 at a logic high level. The ECS control circuit 511 may block the generation of the ECS read signal ECS_RD, the ECS write signal ECS_WT, and the first to twelfth ECS addresses ECS_ADD<1:12> when the flag signal FLAG is generated at a logic high level.

The ECS operation S34 includes sequentially performing a read operation of an ECS operation and a write operation of the ECS operation on all the memory cells that are included in the memory circuit 330 in response to detecting the logic level of the flag signal. The ECS operation S34 may include a read operation and write operation S341, an address counting operation S342, and detecting S343 when an ECS operation ends.

The read operation and write operation S341 may include sequentially performing the read operation and write operation of the ECS operation.

During the read operation and write operation S131 of the ECS operation S34, the operation control circuit 512 of a controller 10_1 may generate the first to third commands CMD<1:3> and the first to twelfth addresses ADD<1:12> based on the ECS read signal ECS_RD, the ECS write signal ECS_WT, and the first to twelfth ECS addresses ECS_ADD<1:12> in synchronization with the clock signal CLK.

During the read operation and write operation S341 of the ECS operation S34, the command decoder 310 of the semiconductor device 20 may generate the write signal WT after generating the read signal RD in response to decoding the first to third commands CMD<1:3>. The address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> that are sequentially activated by decoding the first to twelfth addresses ADD<1:12>. The memory circuit 330 of the semiconductor device 20 may output the first to eighth internal data ID<1:8> and the first to third internal parities IP<1:3> as the first bank group 331 to the fourth bank group 334 are sequentially activated. The data input and output circuit 340 of the semiconductor device 20 may output the first to eighth internal data ID<1:8> as the first to eighth data DATA<1:8> and output the first to third internal parities IP<1:3> as the first to third parities PRT<1:3> after the start of the read operation of the ECS operation S34.

The data processing circuit 541 of the controller 10_1 may generate the first to eighth transfer data TD<1:8> from the first to eighth data DATA<1:8> after the start of the read operation of the ECS operation S34. The data processing circuit 541 of the controller 10_1 may generate the first to third transfer parities TP<1:3> from the first to third parities PRT<1:3> after the start of the read operation of the ECS operation S34. The error correction circuit 542 of the controller 10_1 may generate the first to eighth correction data CD<1:8> by correcting at least one error in the first to eighth transfer data TD<1:8>, based on the first to eighth transfer data TD<1:8> and the first to third transfer parities TP<1:3> after the start of the read operation of the ECS operation S34. The error correction circuit 542 may store the first to eighth correction data CD<1:8> after the start of the read operation of the ECS operation. The error correction circuit 542 may output the first to eighth correction data CD<1:8> having one or more errors corrected after the start of the write operation of the ECS operation. The data processing circuit 541 may generate the first to eighth data DATA<1:8> from the first to eighth correction data CD<1:8> and output the first to eighth data DATA<1:8> to the semiconductor device 20 after the start of the write operation of the ECS operation S34.

The data input and output circuit 340 of the semiconductor device 20 may output the first to eighth data DATA<1:8> as the first to eighth internal data ID<1:8> after the start of the write operation of the ECS operation S34. The memory circuit 330 of the semiconductor device 20 may store the first to eighth internal data ID<1:8> as the first bank group 331 to the fourth bank group 334 are sequentially activated. The first to eighth internal data ID<1:8> having one or more errors corrected may be stored at the same memory cell locations, among the multiple memory cells that are included in the memory circuit 330, where the internal data (ID<1:8> was stored prior to being corrected.

The address counting operation S342 includes up-counting the first to fourth bank group addresses BG<1:4>, the first to fourth bank addresses BK<1:4>, the first to sixteenth row addresses RA<1:16>, and the first to sixteenth column addresses COL<1:16> once. During the address counting operation S342, the address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> by decoding the first to twelfth addresses ADD<1:12> and up-counting once the first to fourth bank group addresses BG<1:4>, the first to fourth bank addresses BK<1:4>, the first to sixteenth row addresses RA<1:16>, and the first to sixteenth column addresses COL<1:16>.

The ECS operation period detection includes detecting S343 whether the ECS operations have been performed on all the memory cells. During the detecting S343, when the first to twelfth addresses ADD<1:12> at a logic high level are counted and generated and the ECS operations are performed on all the memory cells (YES), the process continues with flag signal generation S35. During the detecting S343, when all of the first to twelfth addresses ADD<1:12> are not counted and generated at a logic high level, in other words the ECS operations for all the memory cells are not completed (NO), the process continues with the read operation and write operation S341 of the ECS operation S34.

The flag signal generation S35 includes generating the flag signal FLAG at a logic high level for a set period of time after the start of a power-down operation and after all the ECS operations are performed on the multiple memory cells. During the flag signal generation S35, the flag generation circuit 530 may generate the flag signal FLAG at a logic high level for the set period from the time at which the self-refresh signal SREF is input after the start of the entry into the power-down operation and after all the ECS operations are performed on the multiple memory cells. The flag generation circuit 530 may generate the flag signal FLAG at a logic low level after the set period. The set period, according to an embodiment of the present disclosure, may be determined as the time period equal to or greater than the time period for which a self-refresh operation is performed twice.

The precharge operation includes performing a precharge operation S36 on all the bank groups that are included in the memory circuit 330. During the precharge operation S36, the operation control circuit 512 of the controller 10_1 may generate the first to third commands CMD<1:3> having a logic level combination for performing the precharge operation when all of the first to twelfth addresses ADD<1:12> are counted and generated at a logic high level.

The command decoder 310 of the semiconductor device 20 may generate the precharge signal PCG after decoding the first to third commands CMD<1:3>. The memory circuit 330 of the semiconductor device 20 may perform a precharge operation on the first to fourth bank groups 331 to 334.

The self-refresh operation includes performing a self-refresh operation S37 sequentially activating all the word lines that are included in the memory circuit 330. The self-refresh operation S37 may be performed when the flag signal FLAG is at a logic high level (YES) during flag signal detection S32. The self-refresh operation step S37 may be performed after the precharge operation S36 is performed. During the self-refresh operation S37, the operation control circuit 512 may generate the first to third commands CMD<1:3> for performing the self-refresh operation because the generation of the ECS read signal ECS_RD, the ECS write signal ECS_WT, and the first to twelfth ECS addresses ECS_ADD<1:12> is blocked when the flag signal FLAG is at a logic high level. During the self-refresh operation S37, the operation control circuit 512 of the controller 10_1 may generate the first to third commands CMD<1:3> for performing the self-refresh operation after the precharge operation S36 is performed.

The command decoder 310 of the semiconductor device 20 may generate the internal refresh signal IR after decoding the first to third commands CMD<1:3>. The address decoder 320 of the semiconductor device 20 may generate the first to fourth bank group addresses BG<1:4>, the first to fourth bank addresses BK<1:4>, the first to sixteenth row addresses RA<1:16>, and the first to sixteenth column addresses COL<1:16> that are sequentially activated. The memory circuit 330 of the semiconductor device 20 may perform the self-refresh operation S37 including sequentially activating the multiple word lines as the first bank group 331 to the fourth bank group 334 are sequentially activated. When the self-refresh operation S37 is completed or terminated, the process continues with power-down entry S31.

The ECS method according to the above embodiment of the present disclosure may advantageously prevent the occurrence of an error of internal data stored in a memory cell MC by performing a self-refresh operation after completing ECS operations for all the memory cells of the first to fourth bank groups 331 to 334 that are included in the semiconductor device 20 after the start of entry into a power-down operation. The ECS method may advantageously prevent the omission of an ECS operation for a memory cell MC by performing a self-refresh operation after completing ECS operations for all the memory cells of the first to fourth bank groups 331 to 334 that are included in the semiconductor device 20 after the start of entry into a power-down operation.

Figure 20:
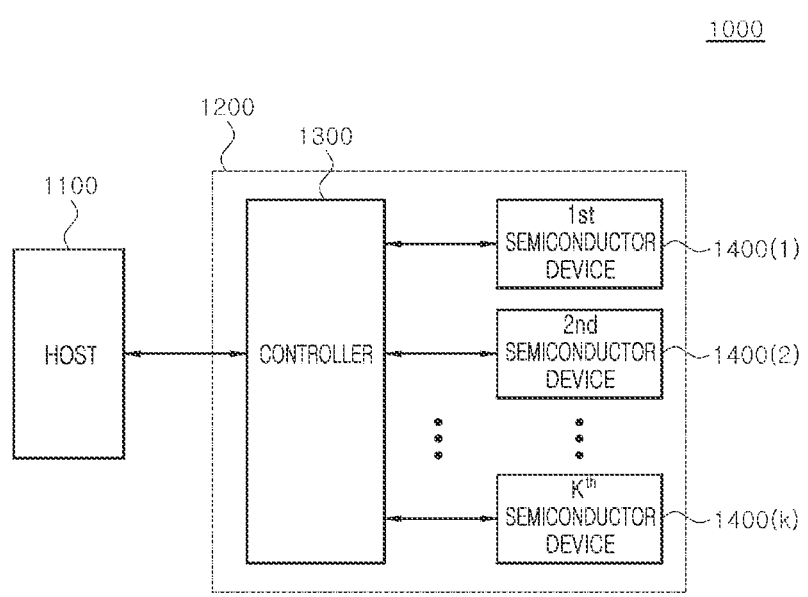
FIG. 20 is a block diagram illustrating an embodiment of an electronic system applicable to the semiconductor system illustrated in FIG. 1 and FIG. 19.

FIG. 20 is a block diagram illustrating an embodiment of an electronic system 1000 according to an embodiment of the present disclosure. As illustrated in FIG. 20, the electronic system 1000 may include a host 1100 and a semiconductor system 1200.

The host 1100 and the semiconductor system 1200 may mutually transmit signals by using an interface protocol. The interface protocol that is used between the host 1100 and the semiconductor system 1200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), serial attached SCSI (Small Computer System Interface) (SAS), and universal serial bus (USB).

The semiconductor system 1200 may include a controller 1300 and semiconductor devices 1400(K:1). The controller 1300 may control the semiconductor devices 1400(K:1) such that the semiconductor devices 1400(K:1) perform a power-down operation, an ECS operation, and a self-refresh operation. Each of the semiconductor devices 1400(K:1) may perform a power-down operation, an ECS operation, and a self-refresh operation, as described above. The semiconductor system 1200 may advantageously prevent the occurrence of an error in internal data stored in a memory cell MC by performing a self-refresh operation after completing ECS operations on all the memory cells of the multiple bank groups 331 to 334 that are included in each of the semiconductor devices 1400(K:1) after the start of entry into a power-down operation. The semiconductor system 1200 may advantageously prevent the omission of an ECS operation for a memory cell MC by performing a self-refresh operation after completing ECS operations for all the memory cells of the multiple bank groups 331 to 334 that are included in each of the semiconductor devices 1400(K:1) after the start of entry into a power-down operation.

The controller 1300 may be implemented similar to the controller 10 illustrated in FIG. 1 and FIG. 2 or the controller 10_1 illustrated in FIG. 17. Each of the semiconductor devices 1400(K:1) may be implemented similar to the semiconductor device 20 illustrated in FIG. 1 and FIG. 8. According to an embodiment, each of the semiconductor devices 1400(K:1) may be implemented as one of dynamic random-access memory (DRAM), phase change random-access memory (PRAM), resistive random-access memory (RRAM), magnetic random-access memory (MRAM), and ferroelectric random-access memory (FRAM).

What is claimed is:

1. A semiconductor system comprising:
a controller configured to output a command and an address for performing an error check scrub (ECS) operation after a start of entry into a power-down operation, configured to receive data and output the data in response to correcting one or more errors occurring in the data, and configured to output a command for performing a self-refresh operation when the ECS operation is terminated; and
a semiconductor device configured to output, as the data, internal data stored in multiple memory cells after a start of a read operation of the ECS operation in response to receiving the command and the address, configured to receive the data having the one or more errors corrected after a start of a write operation of the ECS operation, configured to store the data having the one or more errors corrected among the multiple memory cells, and configured to perform the self-refresh operation on the multiple memory cells after receiving the command when the ECS operation is terminated, and configured to perform the self-refresh operation after completing the ECS operation on all the multiple memory cells after the start of entry into the power-down operation.

2. The semiconductor system of claim 1, wherein the controller is configured to:
repeatedly output the command for performing the read operation and the write operation after the start of the ECS operation, and
output the command for performing the self-refresh operation after outputting the command for performing a precharge operation when the ECS operation is terminated.

3. The semiconductor system of claim 1, wherein the controller is configured to output the address by sequentially counting the address after the start of the ECS operation.

4. The semiconductor system of claim 1, wherein the controller is configured to:
store the data in response to correcting the one or more errors occurring in the data after the start of the read operation of the ECS operation,
store the address for selecting a memory cell at which the data are output and
output the data that have been stored after the start of the write operation of the ECS operation and the address.

5. The semiconductor system of claim 1, wherein the controller comprises:
a command control circuit configured to output the command for performing the self-refresh operation after outputting the command and the address for performing the read operation and write operation of the ECS operation; and
a data control circuit configured to correct the one or more errors in the data after the start of the read operation of the ECS operation, configured to store the data having the one or more errors corrected, and configured to output the data having the one or more errors corrected after the start of the write operation of the ECS operation.

6. The semiconductor system of claim 5, wherein the command control circuit comprises:
an ECS control circuit configured to generate an ECS read signal for performing the read operation, an ECS write signal for performing the write operation, and ECS addresses that are sequentially counted from a time at which a self-refresh signal that is generated after the start of the entry into the power-down operation is input to a time at which an ECS end signal, that is generated when the ECS operation is terminated, is input; and
an operation control circuit configured to generate the command based on the ECS read signal and the ECS write signal in synchronization with a clock signal and configured to output the ECS address as the address.

7. The semiconductor system of claim 6, wherein the ECS control circuit comprises:
a start signal generation circuit configured to generate a start signal that is generated from the time at which the self-refresh signal is input to the time at which the ECS end signal is input;
an ECS command generation circuit configured to generate an ECS command when the start signal is generated and configured to generate counting signals that are sequentially counted in synchronization with the clock signal; and
an ECS signal generation circuit configured to generate the ECS read signal and the ECS write signal that are sequentially generated when the ECS command is generated, and the counting signals are counted and configured to generate the ECS addresses that are sequentially counted.

8. The semiconductor system of claim 6, wherein the operation control circuit comprises:
a selection transfer circuit configured to generate a selection read signal, a selection write signal, and a selection address, based on the ECS read signal, the ECS write signal, and the ECS addresses triggered by the start signal, an external read signal, an external write signal, and an external address; and
a read-write control circuit configured to generate the command for performing a precharge operation and the self-refresh operation after generating the command for performing the read operation and the write operation based on the selection read signal and the selection write signal, configured to generate the address from the selection address, and configured to block the generation of the command for performing the write operation by an error detection signal.

9. The semiconductor system of claim 5, wherein the data control circuit comprises:
a data processing circuit configured to generate transfer data and a transfer parity from the data and a parity after the start of the read operation and configured to generate the data based on correction data after the start of the write operation; and
an error correction circuit configured to correct one or more errors that are included in the transfer data based on the transfer data and the transfer parity after the start of the read operation, configured to store the transfer data having the one or more errors corrected as the correction data, and configured to output the correction data after the start of the write operation.

10. The semiconductor system of claim 1, wherein the semiconductor device comprises:
a command decoder configured to generate an active signal, a read signal, and a write signal for performing the ECS operation by decoding the command in synchronization with a clock signal and configured to generate a precharge signal for performing a precharge operation and an internal refresh signal for performing the self-refresh operation when the ECS operation is terminated;
an address decoder configured to generate a bank group address, a bank address, a row address, and a column address based on the address in synchronization with the clock signal;
a memory circuit configured to output internal data and an internal parity stored in the memory circuit based on the bank group address, the bank address, the row address, and the column address when the read signal is generated, configured to store the internal data based on the bank group address, the bank address, the row address, and the column address when the write signal is generated, configured to perform the precharge operation when the precharge signal is generated, and configured to perform the self-refresh operation when the internal refresh signal is generated; and
a data input and output circuit configured to generate the data from the internal data after the start of the read operation, configured to generate the parity from the internal parity, and configured to generate the internal data from the data after the start of the write operation.

11. The semiconductor system of claim 10, wherein:
the memory circuit comprises multiple bank groups,
each of the multiple bank groups comprises multiple banks,
each of the multiple banks comprises multiple word lines and multiple column lines, and
the multiple memory cells are connected to the multiple word lines and the multiple column lines.

12. A semiconductor system comprising:
a controller configured to output a command and an address for performing an error check scrub (ECS) operation after a start of entry into a power-down operation, configured to receive data and output the data in response to correcting one or more errors occurring in the data, configured to generate a flag signal that is generated for a set period after the start of the entry into the power-down operation, and configured to block the output of the command and the address for the ECS operation while the flag signal is generated when the power-down operation is entered after the ECS operation is completed; and
a semiconductor device configured to output, as the data, internal data stored in multiple memory cells after a start of a read operation of the ECS operation in response to receiving the command and the address, configured to receive the data having the one or more errors corrected after a start of a write operation of the ECS operation, configured to store the data having the one or more errors corrected among the multiple memory cells, and configured to perform a self-refresh operation after completing the ECS operation on all the multiple memory cells after the start of entry into the power-down operation.

13. The semiconductor system of claim 12, wherein the flag signal is generated for the set period when all ECS operations for the multiple memory cells are performed.

14. The semiconductor system of claim 12, wherein:
the controller is configured to output the command for performing a self-refresh operation after the start of the entry into the power-down operation for a period during which the flag signal is generated at a first level, and
the controller is configured to output the command and the address for performing the ECS operation after the start of the entry into the power-down operation for a period during which the flag signal is generated at a second level different from the first level.

15. The semiconductor system of claim 12, wherein:
the controller is configured to output the command for performing the self-refresh operation after outputting the command for performing a precharge operation when the ECS operation is terminated, and
the semiconductor device is configured to perform the self-refresh operation on the multiple memory cells after performing the precharge operation in response to receiving the command when the ECS operation is terminated.

16. The semiconductor system of claim 12, wherein the controller comprises:
a command control circuit configured to output the command for performing a self-refresh operation after outputting the command and the address for performing the read operation and write operation of the ECS operation and configured to block the output of the command and the address for performing the read operation and write operation of the ECS operation for a period in which the flag signal is generated;

a flag signal generation circuit configured to generate the flag signal that is generated for the set period from a time at which the self-refresh signal is input after the start of the entry into the power-down operation after all the ECS operations are performed on the multiple memory cells; and
a data control circuit configured to correct one or more errors in the data after the start of the read operation of the ECS operation, configured to store the data having the one or more errors corrected, and configured to output the data having the one or more errors corrected after the start of the write operation of the ECS operation.

17. The semiconductor system of claim 16, wherein the command control circuit comprises:
an ECS control circuit configured to generate an ECS read signal for performing the read operation, an ECS write signal for performing the write operation, and ECS addresses that are sequentially counted from the time at which the self-refresh signal that is generated after the start of the entry into the power-down operation is input to the time at which an ECS end signal, that is generated when the ECS operation is terminated, is input and configured to block the generation of the ECS read signal, the ECS write signal, and the ECS addresses for the period during which the flag signal is generated; and
an operation control circuit configured to generate the command based on the ECS read signal and the ECS write signal in synchronization with a clock signal and configured to output the ECS addresses as the address.

18. The semiconductor system of claim 16, wherein the data control circuit comprises:
a data control circuit configured to generate transfer data and a transfer parity from the data and a parity after the start of the read operation and configured to generate the data based on correction data after the start of the write operation; and
an error correction circuit configured to correct one or more errors in the transfer data based on the transfer data and the transfer parity after the start of the read operation, configured to store the transfer data having the one or more errors corrected as the correction data, and configured to output the transfer data having the one or more errors corrected as the correction data after the start of the write operation.

19. The semiconductor system of claim 12, wherein the semiconductor device comprises:
a command decoder configured to generate an active signal, a read signal, and a write signal for performing the ECS operation by decoding the command in synchronization with a clock signal and configured to generate a precharge signal for performing a precharge operation and an internal refresh signal for performing the self-refresh operation when the ECS operation is terminated;
an address decoder configured to generate a bank group address, a bank address, a row address, and a column address based on the address in synchronization with the clock signal;
a memory circuit configured to output internal data and an internal parity stored in the memory circuit based on the bank group address, the bank address, the row address, and the column address when the read signal is generated, configured to store the internal data based on the bank group address, the bank address, the row address, and the column address when the write signal is generated, configured to perform the precharge operation when the precharge signal is generated, and configured to perform the self-refresh operation when the internal refresh signal is generated; and a data input and output circuit configured to generate the data from the internal data after the start of the read operation, configured to generate the parity from the internal parity, and configured to generate the internal data from the data after the start of the write operation.

20. The semiconductor system of claim 19, wherein:
the memory circuit comprises multiple bank groups,
each of the multiple bank groups comprises multiple banks,
each of the multiple banks comprises multiple word lines and multiple column lines, and
the multiple memory cells are connected to the multiple word lines and the multiple column lines.

21. An error check scrub method comprising:
an error check scrub (ECS) operation comprising sequentially performing a read operation and a write operation on multiple memory cells after a start of a power-down operation;
a precharge operation comprising applying a precharge signal to the multiple memory cells when ECS operations for the multiple memory cells are terminated; and
a self-refresh operation comprising sequentially activating multiple word lines that are connected to the multiple memory cells after the precharge operation is performed, and
wherein the self-refresh operation is performed after completing the ECS operation on all multiple memory cells of the first bank group and the second bank group after the start of the power-down operation.

22. The error check scrub method of claim 21, wherein the ECS operation comprises repeatedly performing the read operation and write operation of the ECS operation from the time at which a self-refresh signal is input to the time at which an ECS end signal is input after the start of the power-down operation.

23. The error check scrub method of claim 21, wherein the ECS operation comprises
correcting one or more errors of internal data that are output from a memory cell on which the read operation of the ECS operation is performed, and
storing the internal data having the one or more errors corrected in the memory cell.

24. The error check scrub method of claim 21, wherein the ECS operation comprises:
a read operation and write operation of an ECS operation for sequentially performing the read operation and write operation of the ECS operation on the multiple memory cells;
an address counting operation of up-counting an address for selecting the multiple memory cells after the read operation and write operation of the ECS operation are performed based on the address; and
detecting whether the ECS operation was performed on the multiple memory cells.

25. The error check scrub method of claim 24, further comprising:
re-entering the ECS operation until all the addresses are counted, and
entering the precharge operation when all the addresses are counted.

26. An error check scrub method comprising:
an error check scrub (ECS) operation comprising alternately performing a read operation and a write operation on a first bank group and a second bank group after a start of a power-down operation;
a precharge operation comprising applying a precharge signal to the first bank group and the second bank group when ECS operations for the first bank group and the second bank group are terminated; and
a self-refresh operation comprising sequentially activating multiple word lines that are connected to multiple memory cells after the precharge operation is performed, and
wherein the self-refresh operation is performed after completing the ECS operation on all multiple memory cells of the first bank group and the second bank group after the start of the power-down operation.

27. The error check scrub method of claim 26, wherein the ECS operation comprises repeatedly performing the read operation and write operation the second bank group after performing the read operation and write operation on the first bank group from the time at which a self-refresh signal is input to the time at which an ECS end signal is input after the start of the power-down operation.

28. The error check scrub method of claim 26, wherein the ECS operation comprises:
a read operation and write operation of a first ECS operation comprising performing the read operation and write operation on multiple memory cells that are included in the first bank group;
a read operation and write operation of a second ECS operation comprising performing the read operation and write operation on multiple memory cells that are included in the second bank group after the read operation and write operation are performed;
an address counting operation comprising up-counting an address for selecting the multiple memory cells that are included in the first and second bank groups after the read operations and write operations are performed based on the address; and
detecting whether ECS operations have been performed on the multiple memory cells that are included in the first and second bank groups.

29. The error check scrub method of claim 26, wherein the precharge operation comprises:
a first precharge operation comprising performing a precharge operation on the first bank group when ECS operations for the first and second bank groups are terminated; and
a second precharge operation comprising performing a precharge operation on the second bank group when the first precharge operation step is terminated.

30. An error check scrub method comprising:
an error check scrub (ECS) operation comprising sequentially performing a read operation and a write operation on multiple memory cells by detecting a logic level of a flag signal after a start of a power-down operation;
generating the flag signal for a set period when all ECS operations are performed on the multiple memory cells and the power-down operation is entered;
a precharge operation comprising applying a precharge signal to the multiple memory cells when ECS operations are terminated on the multiple memory cells; and
a self-refresh operation comprising sequentially activating multiple word lines that are connected to the multiple memory cells after the flag signal is enabled or the precharge operation is performed, and wherein the self-refresh operation is performed after completing the ECS operation on all the multiple memory cells after the start of the power-down operation.

31. The error check scrub method of claim 30, further comprising:
generating the flag signal that is enabled when all the ECS operations are performed on the multiple memory cells and the power-down operation is entered, and
sensing when the flag signal is disabled after a set period in which the self-refresh operation performed multiple times.

32. The error check scrub method of claim 30:
wherein the ECS operation comprises repeatedly performing the read operation and write operation of the ECS operation when the flag signal is disabled after the start of the power-down operation, and
wherein the read operation and write operation of the ECS operation is blocked when the flag signal is enabled after the start of the power-down operation.

33. The error check scrub method of claim 30, wherein the ECS operation comprises:
correcting one or more errors of internal data that are output by a memory cell on which the read operation of the ECS operation is performed and
storing the internal data having the one or more errors corrected in the memory cell.

34. The error check scrub method of claim 30, wherein the ECS operation comprises:
a read operation and write operation comprising sequentially performing the read operation and write operation on the multiple memory cells when the flag signal is disabled and blocking the read operation and write operation of the ECS operation when the flag signal is enabled;
an address counting operation comprising up-counting an address for selecting the multiple memory cells after the read operation and write operation of the ECS operation are performed based on the address; and
detecting whether the ECS operations have been performed on the multiple memory cells.

35. The error check scrub method of claim 34, further comprising:
re-entering the read operation and write operation until all the addresses are counted, and
entering the precharge operation when all the addresses are counted.

36. A semiconductor system comprising:
a controller configured to perform an error check scrub (ECS) operation after entering a power-down operation, configured to correct one or more errors occurring in received data yielding corrected data and output the corrected data, and configured to output a command for performing a self-refresh operation when the ECS operation is terminated; and
a semiconductor device configured to output data stored in multiple memory cells, configured to receive and store the corrected data in a plurality of the multiple memory cells, and configured to perform a self-refresh operation on the multiple memory cells in response to receiving the command when the ECS operation is terminated, and configured to perform the self-refresh operation after completing the ECS operation on all the multiple memory cells after entering the power-down operation.

37. A semiconductor system comprising:
a controller configured to perform an error check scrub (ECS) operation after entering a power-down operation, configured to correct one or more errors occurring in received data yielding corrected data and output the corrected data, configured to generate a flag signal for a set period after the entering the power-down operation, and configured to block the ECS operation while the flag signal is generated when the power-down operation is entered after the ECS operation is completed; and
a semiconductor device configured to output data stored in multiple memory cells and configured to receive and store the corrected data in a plurality of the multiple memory cells, and configured to perform a self-refresh operation after completing the ECS operation on all the multiple memory cells after entering the power-down operation.

* * * * *